US011568617B2

(12) United States Patent
Sung et al.

(10) Patent No.: US 11,568,617 B2
(45) Date of Patent: Jan. 31, 2023

(54) FULL BODY VIRTUAL REALITY UTILIZING COMPUTER VISION FROM A SINGLE CAMERA AND ASSOCIATED SYSTEMS AND METHODS

(71) Applicant: NEX Team Inc., San Jose, CA (US)

(72) Inventors: On Loy Sung, Lai Chi Kok (HK); Keng Fai Lee, Cupertino, CA (US)

(73) Assignee: NEX Team Inc., San Jose, CA (US)

( * ) Notice: Subject to any disclaimer, the term of this patent is extended or adjusted under 35 U.S.C. 154(b) by 0 days.

(21) Appl. No.: 17/741,617

(22) Filed: May 11, 2022

(65) Prior Publication Data
US 2022/0366653 A1 Nov. 17, 2022

Related U.S. Application Data

(60) Provisional application No. 63/187,418, filed on May 12, 2021.

(51) Int. Cl.
*G06T 19/00* (2011.01)
*G06T 17/20* (2006.01)
(Continued)

(52) U.S. Cl.
CPC .............. *G06T 19/006* (2013.01); *G06T 7/10* (2017.01); *G06T 7/50* (2017.01); *G06T 7/64* (2017.01);
(Continued)

(58) Field of Classification Search
None
See application file for complete search history.

(56) References Cited

U.S. PATENT DOCUMENTS

2012/0143358 A1\* 6/2012 Adams .................. A63F 13/814
700/92
2017/0132836 A1\* 5/2017 Iverson ................... G06T 17/05
(Continued)

FOREIGN PATENT DOCUMENTS

| CN | 111344644 A | 6/2020 |
| WO | 2020091096 A1 | 5/2020 |
| WO | 2020263232 A1 | 12/2020 |

OTHER PUBLICATIONS

Guo et al., "The Relightables: Volumetric Performance Capture of Humans with Realistic Relighting", ACM Transactions on Graphics, vol. 38, No. 6, Article 217, Nov. 2019, pp. 1-19.

*Primary Examiner* — Frank S Chen
(74) *Attorney, Agent, or Firm* — American Patent Agency PC; Daniar Hussain; Xiaomeng Shi

(57) ABSTRACT

Methods and systems for constructing a three-dimensional (3D) model of a user in a virtual environment for full body virtual reality (VR) applications are described. The method includes receiving an image of the user captured using an RGB camera; detecting a body bounding box associated with the user using a first trained neural network; determining a segmentation map of the user, based on the body bounding box; determining a two-dimensional (2D) contour of the user from the segmentation map; forming a 3D extrusion model by extruding the 2D contour; and constructing the 3D model of the user in the virtual environment by applying a geometric transformation to the 3D extrusion model. Applications of full body VR include physical training and fitness sessions, games, control of computing devices, manipulation and display of data, interactive social media with VR, and the like.

18 Claims, 25 Drawing Sheets

(51) Int. Cl.
*G06T 7/10* (2017.01)
*G06T 7/64* (2017.01)
*G06T 7/50* (2017.01)

(52) U.S. Cl.
CPC .......... *G06T 17/20* (2013.01); *G06T 2200/08* (2013.01); *G06T 2207/10024* (2013.01); *G06T 2207/20021* (2013.01); *G06T 2207/20036* (2013.01); *G06T 2207/20084* (2013.01); *G06T 2207/30196* (2013.01); *G06T 2210/12* (2013.01); *G06T 2210/44* (2013.01)

(56) References Cited

U.S. PATENT DOCUMENTS

2019/0096045 A1* 3/2019 Chen ........................ G06T 5/009
2021/0322856 A1* 10/2021 Virkar ................ A63B 71/0622

\* cited by examiner

|   |   |   |   |   |   |   |   |   |
|---|---|---|---|---|---|---|---|---|
| 9 | 9 | 9 | 9 | 9 | 9 | 9 | 9 | 9 |
| 9 | 9 | 9 | 9 | 3 | 9 | 9 | 9 | 9 |
| 9 | 9 | 9 | 9 | 2 | 9 | 9 | 9 | 9 |
| 9 | 9 | 2 | 2 | 2 | 2 | 2 | 9 | 9 |
| 9 | 9 | 1 | 2 | 1 | 2 | 2 | 9 | 9 |
| 9 | 9 | 1 | 2 | 2 | 2 | 2 | 9 | 9 |
| 9 | 9 | 9 | 2 | 2 | 2 | 9 | 9 | 9 |
| 9 | 9 | 9 | 2 | 2 | 2 | 9 | 9 | 9 |
| 9 | 9 | 9 | 2 | 2 | 2 | 9 | 9 | 9 |
| 9 | 9 | 9 | 1 | 3 | 1 | 9 | 9 | 9 |
| 1 | 1 | 1 | 1 | 1 | 1 | 1 | 1 | 1 |

FIG. 8A

|   |   |   |   |   |   |   |   |   |
|---|---|---|---|---|---|---|---|---|
| 0 | 0 | 0 | 0 | 0 | 0 | 0 | 0 | 0 |
| 0 | 0 | 0 | 0 | 1 | 0 | 0 | 0 | 0 |
| 0 | 0 | 0 | 0 | 1 | 0 | 0 | 0 | 0 |
| 0 | 0 | 1 | 1 | 1 | 1 | 1 | 0 | 0 |
| 0 | 0 | 1 | 1 | 1 | 1 | 1 | 0 | 0 |
| 0 | 0 | 1 | 1 | 1 | 1 | 1 | 0 | 0 |
| 0 | 0 | 0 | 1 | 1 | 1 | 0 | 0 | 0 |
| 0 | 0 | 0 | 1 | 1 | 1 | 0 | 0 | 0 |
| 0 | 0 | 0 | 1 | 1 | 1 | 0 | 0 | 0 |
| 0 | 0 | 0 | 1 | 1 | 1 | 0 | 0 | 0 |
| 1 | 1 | 1 | 1 | 1 | 1 | 1 | 1 | 1 |

FIG. 8B

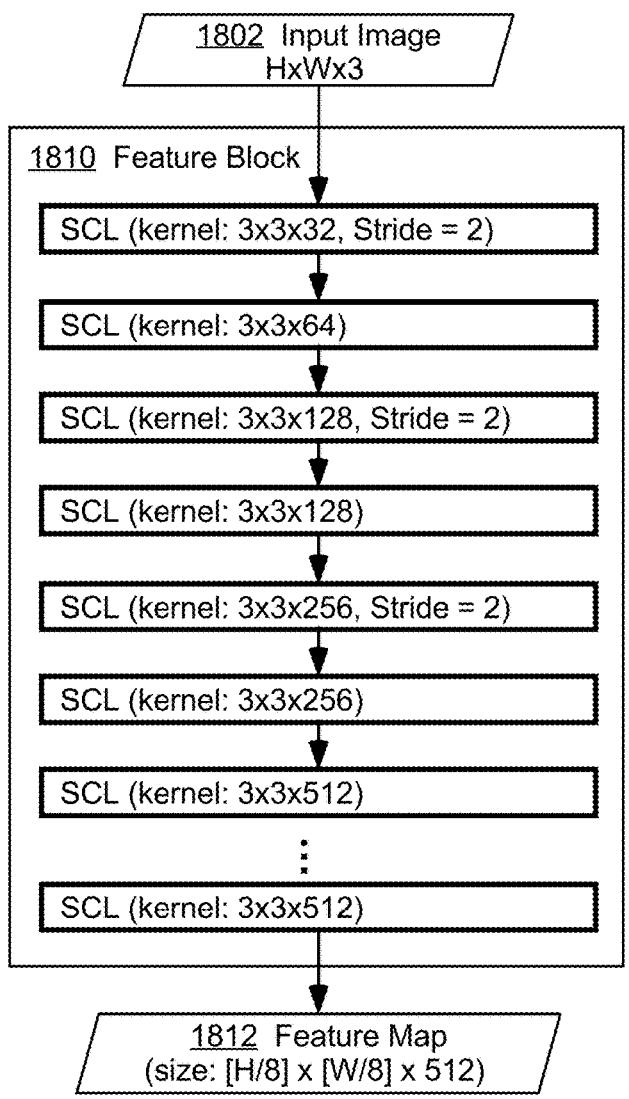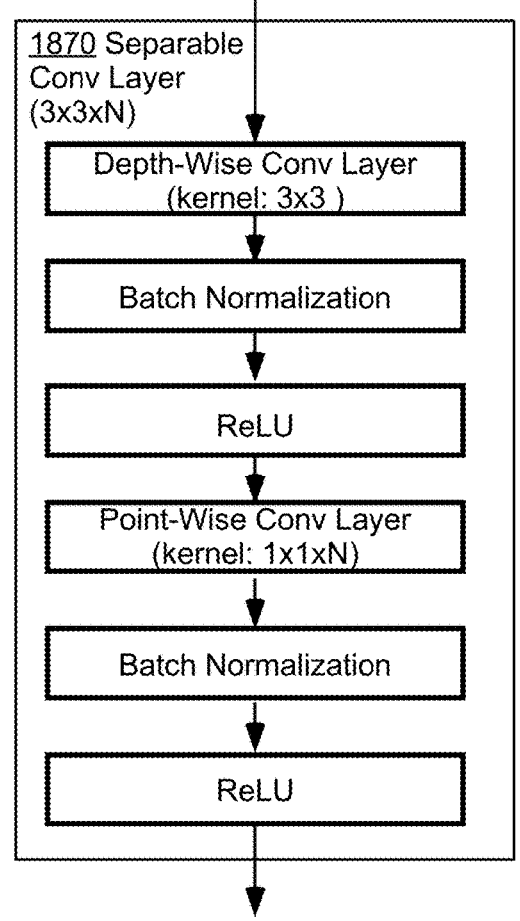
FIG. 18B
FIG. 18C

FULL BODY VIRTUAL REALITY UTILIZING COMPUTER VISION FROM A SINGLE CAMERA AND ASSOCIATED SYSTEMS AND METHODS

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

This application is also related to U.S. Ser. No. 17/503,295, filed on 16 Oct. 2021, entitled "Repetition Counting and Classification of Movements Systems and Methods", and U.S. Ser. No. 17/518,850, filed on 4 Nov. 2021, entitled "Video-Based Motion Counting and Analysis Systems and Methods for Virtual Fitness Application".

This application is also related to U.S. Pat. No. 10,489,656 issued from U.S. Ser. No. 16/109,923, filed on 23 Aug. 2018, entitled "Methods and Systems for Ball Game Analytics with a Mobile Device", and to U.S. Ser. No. 16/424,287, filed on 28 May 2019, entitled "Methods and Systems for Generating Sports Analytics with a Mobile Device".

This application is further related to U.S. Pat. No. 10,643,492 issued from U.S. Ser. No. 16/445,893, filed on 19 Jun. 2019, entitled "Remote Multiplayer Interactive Physical Gaming with Mobile Computing Devices", and to U.S. Pat. No. 10,930,172 issued from U.S. Ser. No. 16/792,190, filed on 15 Feb. 2020, entitled "Methods and Systems for Facilitating Interactive Training of Body-Eye Coordination and Reaction Time".

The entire disclosures of all referenced applications are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of virtual reality, and more particularly, are directed to systems and methods for generating models of users in a virtual environment using a computing device having one or more cameras for video capture.

BACKGROUND OF THE INVENTION

The statements in this section may serve as a background to help understand the invention and its application and uses, but may not constitute prior art.

The advent of the new metaverse signals a fundamental transformation for the technology industry, with the physical and virtual worlds blending together in ever more aspects, facilitated by the use of virtual and augmented reality devices.

Virtual reality (VR) is a simulated experience in a computer-generated environment, with virtual scenes and objects making the users feel they are immersed in surroundings that may be similar to or completely different from the real world. In fully immersive VR applications, users typically wear head-mounted displays and motion sensors to create an immersive first-person virtual reality experience. An immersive virtual world is re-created in front of the user's field of view via the head-mounted display. In addition, user movements are captured by dedicated motion sensors on the head-mounted display, on one or more hand-held controllers, or on other connected wearable devices. As such, user's interactions with the virtual world are limited by the locations and functionalities of the dedicated motion sensors, and typically a user does not see his or her body in the virtual environment from the first-person perspective.

Augmented reality (AR) is an interactive experience in a computer-enhanced real-world environment, where real-world scenes are enhanced in real-time by virtual objects and other simulated perceptual information such as visuals, audios, and haptics. In AR applications, digital content overlays are superimposed on the physical world, often through a computing device that captures the physical world with a camera. For example, the popular game Pokemon Go displays virtual creatures in video recordings of the users' real-world surroundings, and requests a user to interact with or "flick" a Pokemon ball to capture a virtual creature. In another AR application example, a user may be captured on screen, and virtual cues may be displayed for the user to interact with, thus facilitating physical training or other fitness activities. In this example, the AR experienced is "mirrored" on display, to give the user the experience of looking in a mirror, as is done with images or videos taken by front-facing on-screen cameras. Thus, the user can see his or her own movements mirrored on display, with AR overlays.

Thus, it would be an advancement in the state of the art to provide a full body VR experience that combines aspects of both VR and AR, but implemented without expensive, dedicated, and cumbersome hardware such as motion sensors.

It is against this background that various embodiments of the present invention were developed.

BRIEF SUMMARY OF THE INVENTION

Some embodiments of the present invention include methods, systems, and devices for implementing full body virtual reality (VR) by constructing a three-dimensional (3D) model of a user in a virtual environment using a computing device having a camera.

In one aspect, one embodiment of the present invention is a method for constructing a three-dimensional (3D) model of a user in a virtual environment. The method comprises: receiving an image of the user captured using an RGB camera; detecting a body bounding box associated with the user from the image using a first trained neural network; determining a segmentation map of the user, based on the body bounding box; determining a two-dimensional (2D) contour of the user from the segmentation map; forming a 3D extrusion model of the user by extruding the 2D contour; and constructing the 3D model of the user in the virtual environment by applying a geometric transformation to the 3D extrusion model to position the 3D model of the user at a target location and at a target scale factor in the virtual environment.

In some embodiments, the image of the user captured using the RGB camera comprises at least one of the user's upper body and the user's lower body.

In some embodiments, the RGB camera is an RGB-D camera, the image of the user comprises a depth map associated with the user, and the determining the segmentation map of the user based on the body bounding box comprises: determining an estimated user depth, based on the depth map associated with the user; determining a body center depth pixel from the estimated user depth, the depth map, and the body bounding box; and converting the depth map into a segmentation map, based on the body center depth pixel and an offset.

In some embodiments, the converting the depth map into the segmentation map comprises: converting the depth map into a binary map, based on the body center depth pixel and an offset; and converting the binary map into the segmentation map, by flood filling the binary map from the body center depth pixel.

In some embodiments, the determining the estimated user depth comprises calculating a descriptive statistic of the depth map.

In some embodiments, the determining the body center depth pixel comprises minimizing both a difference to the estimation user depth and a distance from a center of the body bounding box.

In some embodiments, the method further comprises applying noise removal filtering on the binary map by using a morphological transform.

In some embodiments, the determining the segmentation map of the user within the body bounding box comprises processing the image within the body bounding box using a second trained neural network.

In some embodiments, the forming the 3D extrusion model of the user by extruding the 2D contour further comprises converting a polygonal path in the 2D contour to a smooth path comprising one or more cubic Bezier curves having one or more control points based on vertices in the polygonal path.

In some embodiments, wherein the computing device is selected from the group consisting of a mobile phone, a laptop, a tablet, a set-top box, and a smart TV.

In another aspect, one embodiment of the present invention is a system for constructing a three-dimensional (3D) model of a user in a virtual environment, comprising a processor and a non-transitory physical storage medium for storing program code accessible by the processor. The program code when executed by the processor causes the processor to: receive an image of the user captured using an RGB camera; detect a body bounding box associated with the user from the image using a first trained neural network; determine a segmentation map of the user, based on the body bounding box; determine a two-dimensional (2D) contour of the user from the segmentation map; form a 3D extrusion model of the user by extruding the 2D contour; and construct the 3D model of the user in the virtual environment by applying a geometric transformation to the 3D extrusion model to position the 3D model of the user at a target location and at a target scale factor in the virtual environment.

In some embodiments, the image of the user captured using the RGB camera comprises at least one of the user's upper body and the user's lower body.

In some embodiments, the RGB camera is an RGB-D camera, the image of the user comprises a depth map associated with the user, and the program code for determining the segmentation map of the user within the body bounding box, when executed by the processor, causes the processor to: determine an estimated user depth, based on the depth map associated with the user; determine a body center depth pixel from the estimated user depth, the depth map, and the body bounding box; and convert the depth map into a segmentation map, based on the body center depth pixel and an offset.

In some embodiments, the program code for converting the depth map into the segmentation map, when executed by the processor, causes the processor to: convert the depth map into a binary map, based on a depth of the body center depth pixel and the offset; and convert the binary map into the segmentation map, by flood filling the binary map from the body center depth pixel.

In some embodiments, the program code for determining the estimated user depth, when executed by the processor, causes the processor to calculate a descriptive statistic of the depth map.

In some embodiments, the program code for determining the body center depth pixel, when executed by the processor, causes the processor to minimize both a difference to the estimation user depth and a distance from a center of the body bounding box.

In some embodiments, the program code for determining the segmentation map of the user within the body bounding box, when executed by the processor, causes the processor to process the image within the body bounding box using a second trained neural network.

In yet another aspect, one embodiment of the present invention is a non-transitory computer-readable physical storage medium for constructing a three-dimensional (3D) model of a user in a virtual environment, the storage medium comprising program code stored thereon. The program code when executed by a processor causes the processor to: receive an image of the user captured using an RGB camera; detect a body bounding box associated with the user from the image using a first trained neural network; determine a segmentation map of the user, based on the body bounding box; determine a two-dimensional (2D) contour of the user from the segmentation map; form a 3D extrusion model of the user by extruding the 2D contour; and construct the 3D model of the user in the virtual environment by applying a geometric transformation to the 3D extrusion model to position the 3D model of the user at a target location and at a target scale factor in the virtual environment.

In some embodiments, the RGB camera is an RGB-D camera, the image of the user comprises a depth map associated with the user, and the program code for determining the segmentation map of the user within the body bounding box, when executed by the processor, causes the processor to: determine an estimated user depth, based on the depth map associated with the user; determine a body center depth pixel from the estimated user depth, the depth map, and the body bounding box; and convert the depth map into a segmentation map, based on the body center depth pixel and an offset.

In some embodiments, the program code for converting the depth map into the segmentation map, when executed by the processor, causes the processor to: convert the depth map into a binary map, based on a depth of the body center depth pixel and the offset; and convert the binary map into the segmentation map, by flood filling the binary map from the body center depth pixel.

Yet other aspects of the present invention include methods, processes, and algorithms comprising one or more of the steps described herein, and also include the processes and modes of operation of the systems and servers described herein. Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIGS. 8A and 8B are respective before and after depth maps showing an illustrative flood-filling process from a center pixel, according to some embodiments of the present invention.

FIG. 18B is a detailed block diagram illustrating an exemplary Feature Block of FIG. 18A, according to exemplary embodiments of the present invention.

FIG. 18C is a detailed block diagram illustrating an exemplary separable convolutional neural network layer of FIG. 18A, according to exemplary embodiments of the present invention.

DETAILED DESCRIPTION OF THE INVENTION

Figure 1:
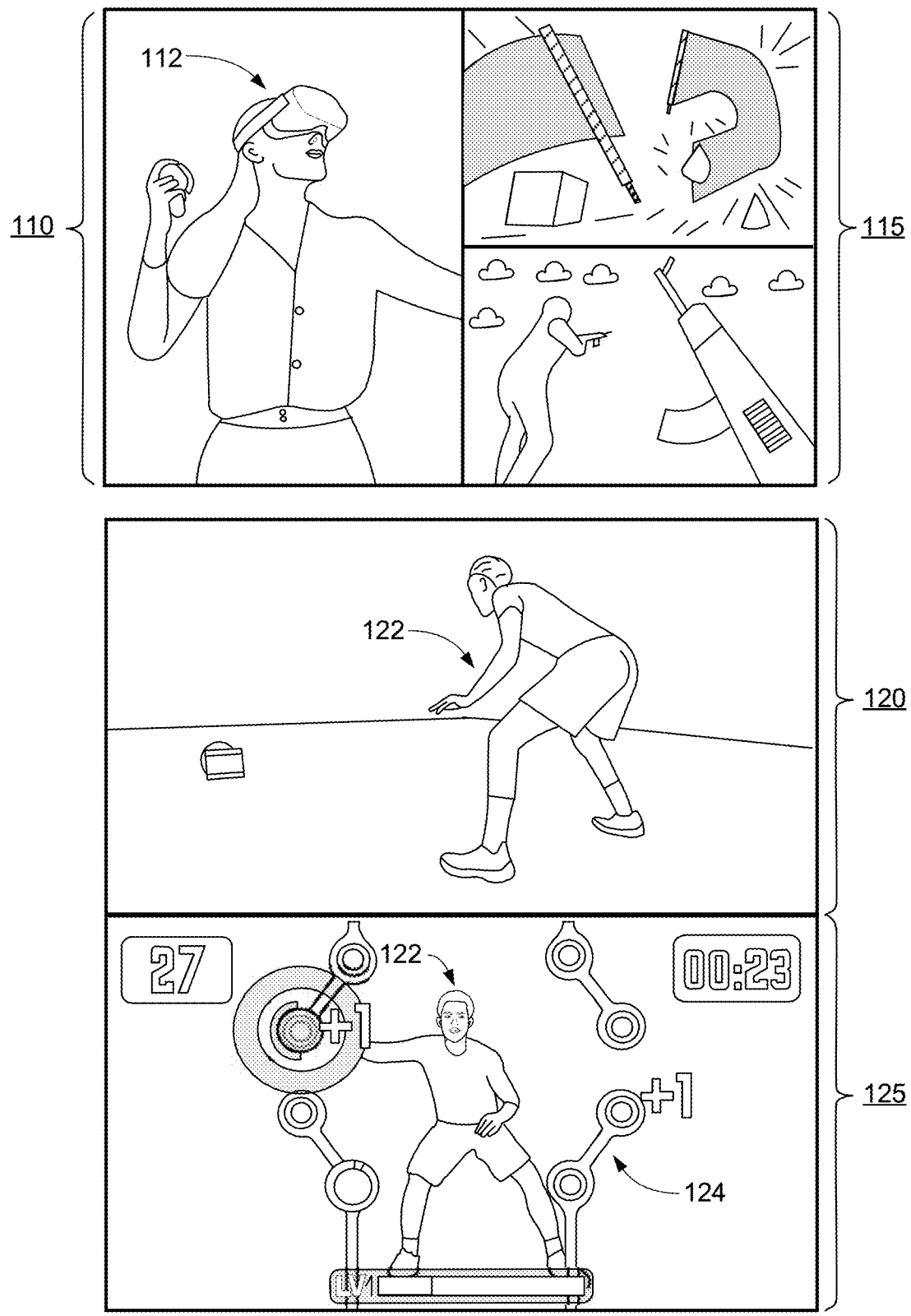
FIG. 1 shows a diagram of related art in immersive virtual reality (VR) and augmented reality (AR), illustrating the context within which the present invention was developed.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

NEX, NEX TEAM, and HOMECOURT are trademark names carrying embodiments of the present invention, and hence, the aforementioned trademark names may be interchangeably used in the specification and drawing to refer to the products/services offered by embodiments of the present invention. The term NEX, NEX TEAM, or HOMECOURT may be used in this specification to describe the overall user capture and 3D virtual model construction system, as well as the company providing said system. With reference to the figures, embodiments of the present invention are now described in detail.

Overview

Broadly, embodiments of the present invention relate to constructing a three-dimensional (3D) model of a user in a virtual reality (VR) environment, from images of the user taken with an RGB or RGB-D camera on a computing device. By utilizing efficient computer vision techniques, the 3D model can be constructed in real-time, without the need for complex and expensive motion sensing hardware typically used in VR applications. More specifically, embodiments of the present invention generate 3D models in a given virtual environment by first segmenting the user from an input image, detecting a 2D contour, forming a 3D model from the 2D contour, then projecting the 3D model into the virtual environment by geometric transformation. In some embodiments, user segmentation is performed on an RGB image using a trained image segmentation neural network. In some embodiments, user segmentation is performed on an associated depth map by flood filing pixels radiating from a body center pixel, without sophisticated neural networks.

Unlike conventional VR systems that require dedicated motion sensing hardware, the disclosed systems and methods are directed at generating a VR experience for users using any suitable computing devices with a camera, with the user's body fully or partially projected into and viewable from the virtual world. In other words, embodiments of the present invention provide a real-time augmented virtual reality using simple computing devices, in which a user can have a virtual representation for interaction in a virtual environment, such as in a VR game.

In the present disclosure, an RGB camera refers to any visible light sensor-based camera that captures or acquires colored images of persons, objects, and the environment. The human eye is sensitive to red, green, and blue (RGB) bands of light, and an RGB camera captures the same RGB bands to produce images almost identical to what the human eyes see. With the widespread use of smartphones, RGB cameras have become ubiquitous. RGB-D cameras are specialized RGB cameras that have depth-sensing components to capture depth data or depth maps associated with the RGB data. For example, the IPHONE TrueDepth camera comprises an infrared emitter and a dedicated infrared camera, and captures depth data by projecting and analyzing thousands of invisible dots. Furthermore, a single RGB or RGB-D camera as disclosed herein refers to a system that may comprise any number of lenses or individual cameras that collectively produce a single photo via computational photography. For example, the latest IPHONE models comprise a three-lens camera system having a telephoto lens, a wide lens, and an ultra-wide lens, as well as Light Detection and Ranger (LiDAR) sensor for creating a depth map of the surroundings.

As embodiments of the present invention employ highly efficient processes for user segmentation and 3D model generation, image and video capture of a user and his or her surroundings by the RGB camera may be performed live as the generated 3D virtual model is projected into a virtual environment. That is, the virtual model or representation of the user in the virtual environment may be shown to the user with minimal delays, enabling the user to see his or her body in the virtual world in real-time, and allowing the user to better interact with the virtual environment. In some embodiments, the virtual environment is augmented with interactive virtual objects, and the disclosed systems can use computer vision techniques to facilitate and/or enable the interaction of the user with the virtual objects (e.g., selecting, tagging, breaking, joining virtual objects, etc.). In some embodiments, the display of the user's virtual representation may be mirrored, as are typical images taken with front-facing cameras. That is, the virtual representation is mirrored to have a similar orientation to what the user would see if looking into a mirror. In yet some embodiments, the user's virtual body representation may be oriented in a configurable manner, to show the user's body fully or partially. When multiple players are present in the same virtual environment, their virtual representations may be orientated jointly, to face each other, face the same direction, or in any desirable directions respectively.

In various embodiments of the present invention, computer vision techniques, such as image registration, segmentation, contour detection, three-dimensional reconstruction techniques, camera calibration techniques (such as camera pose estimation and sensor fusion), and modern machine learning techniques, such as convolutional neural networks (CNNs), may be selectively combined to perform high-accuracy analysis in real-time on almost any computing devices, including but not limited to smart phones, tablets, laptops, desktops, set-top boxes, and the like.

Context of Full Body Virtual Reality within Related Art

FIG. 1 shows a diagram of related art in immersive virtual reality and augmented reality, illustrating the context within which the present invention was developed.

Virtual reality (VR) is a simulated experience in a computer-generated environment, with virtual scenes and objects making the users feel they are immersed in surroundings that may be similar to or completely different from the real world. For fully immersive VR applications such as 115 shown in FIG. 1, a user 112 typically wears a head-mounted display and motion sensors to create an immersive first-person virtual reality experience. An immersive virtual world is re-created in front of the user's field of view via the head-mounted display, while user movements are captured by dedicated motion sensors on the head-mounted display, on one or more hand-held controllers, or on other connected wearable devices, as shown in the physical space setup 110 in FIG. 1. As such, user's interactions with the virtual world are limited by the locations and functionalities of the dedicated motion sensors, and typically the user does not see his or her body in the virtual environment, from the first-person perspective.

Augmented reality (AR) is an interactive experience in a computer-enhanced real-world environment, where real-world scenes are enhanced in real-time by virtual objects and other simulated perceptual information such as visuals, audios, and haptics. In the exemplary AR application 125 shown in FIG. 1, digital content overlays are superimposed on the physical world, through a mobile computing device that captures the physical world with a camera, as illustrated by the physical space setup 120 in FIG. 1. Here user 122 may be captured on screen, and virtual cues such as 124 may be displayed for user 122 to interact with, to facilitate physical training or other fitness activities. In some applications, the AR experienced is "mirrored" on display, to give the user the experience of looking in a mirror, as is done with images or videos taken by front-facing on-screen cameras. Thus, the user can see his or her own movements mirrored on display, with augmented virtual overlays.

Exemplary Embodiment of a Full Body VR Application

In various aspects, embodiments of the disclosure are directed to using a computing device (e.g., smart phone, tablet, laptop, set-top box, and/or the like) for constructing a 3D model of a user or multiple users for use in a virtual environment.

Figure 2:
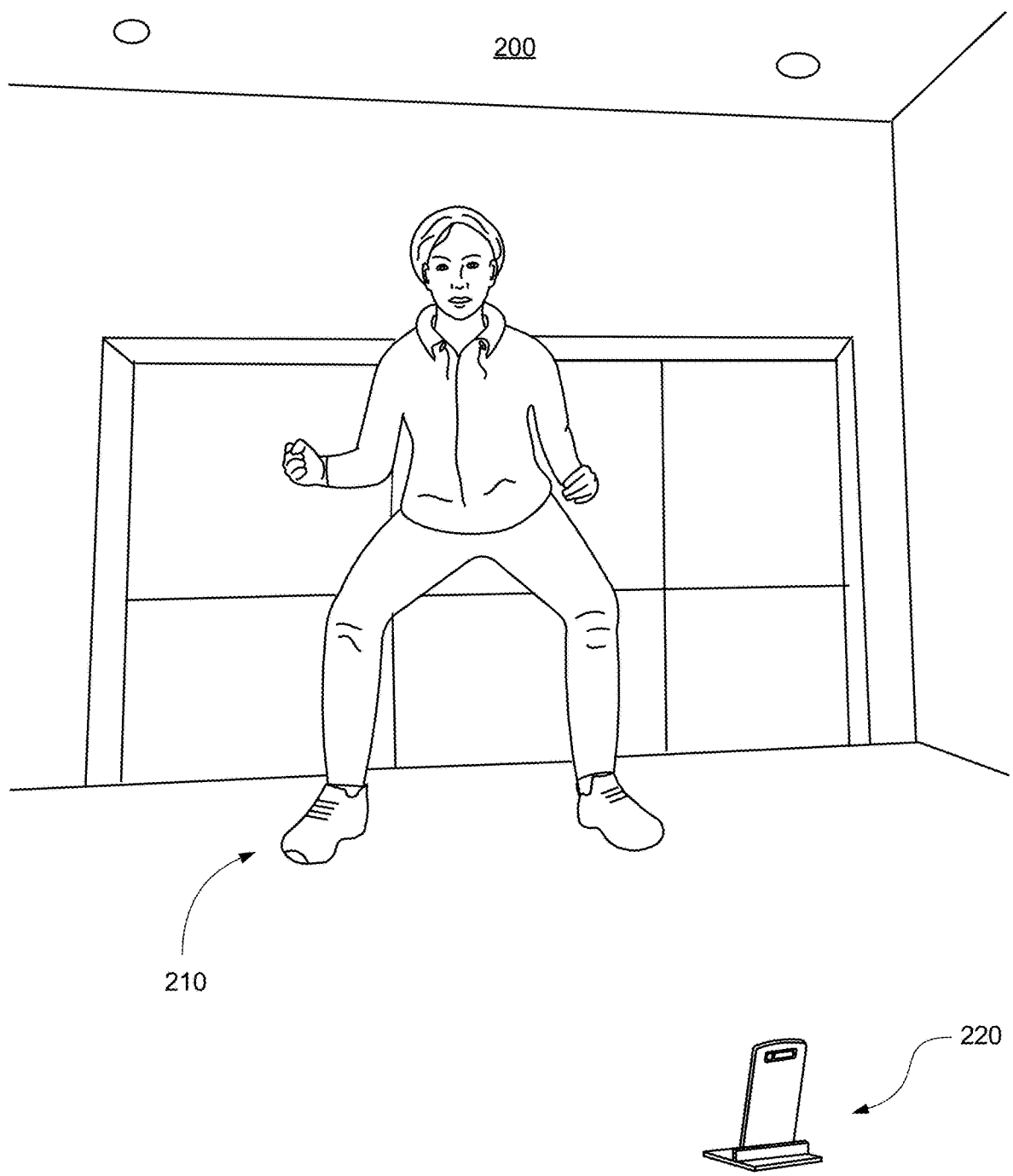
FIG. 2 shows an illustrative setup of the present invention, where a user engages in a full body VR activity in front of a mobile computing device, according to some embodiments of the present invention.

FIG. 2 shows an illustrative setup 200 for the present invention, where a user 210 engages in a full body virtual reality (VR) activity in front of a computing device 220, according to some embodiments of the present invention. In this illustrative embodiment, computing device 220 is a smart phone, and is placed on the floor, at a sufficient distance from user 210 such that at least a portion of user 210's body is captured on screen using a front-facing camera.

In the present disclosure, "full body" refers to capturing one or more of user 210's body parts other than the head, neck, and/or shoulders, such is the case when using a FaceID or doing a video call. That is, an RGB or RGB-D camera on computing device 220 captures arm, leg, upper body, or lower body movements of user 220 for use in constructing a 3D body model for a VR environment. In some embodiments, any image of user 210 as captured by mobile computing device 220 comprises at least one of the user's upper body (e.g., head, neck, shoulders, upper torso, waist, upper arms, elbows, lower arms, and/or hands) and the user's lower body (e.g., waist, hips, upper legs, knees, lower legs, ankles, and/or feet).

In this illustrative setup, user 210 is standing in front of a window in an indoor space. Embodiments of the present invention may be used in indoor or outdoor settings, under varying lighting conditions. Embodiments of the present invention may also be capable of supporting flexible placement of the mobile device (e.g., on the floor, on a table, on a tripod, on the wall), and are resilient to vibration or accidental movements.

Figure 3A:
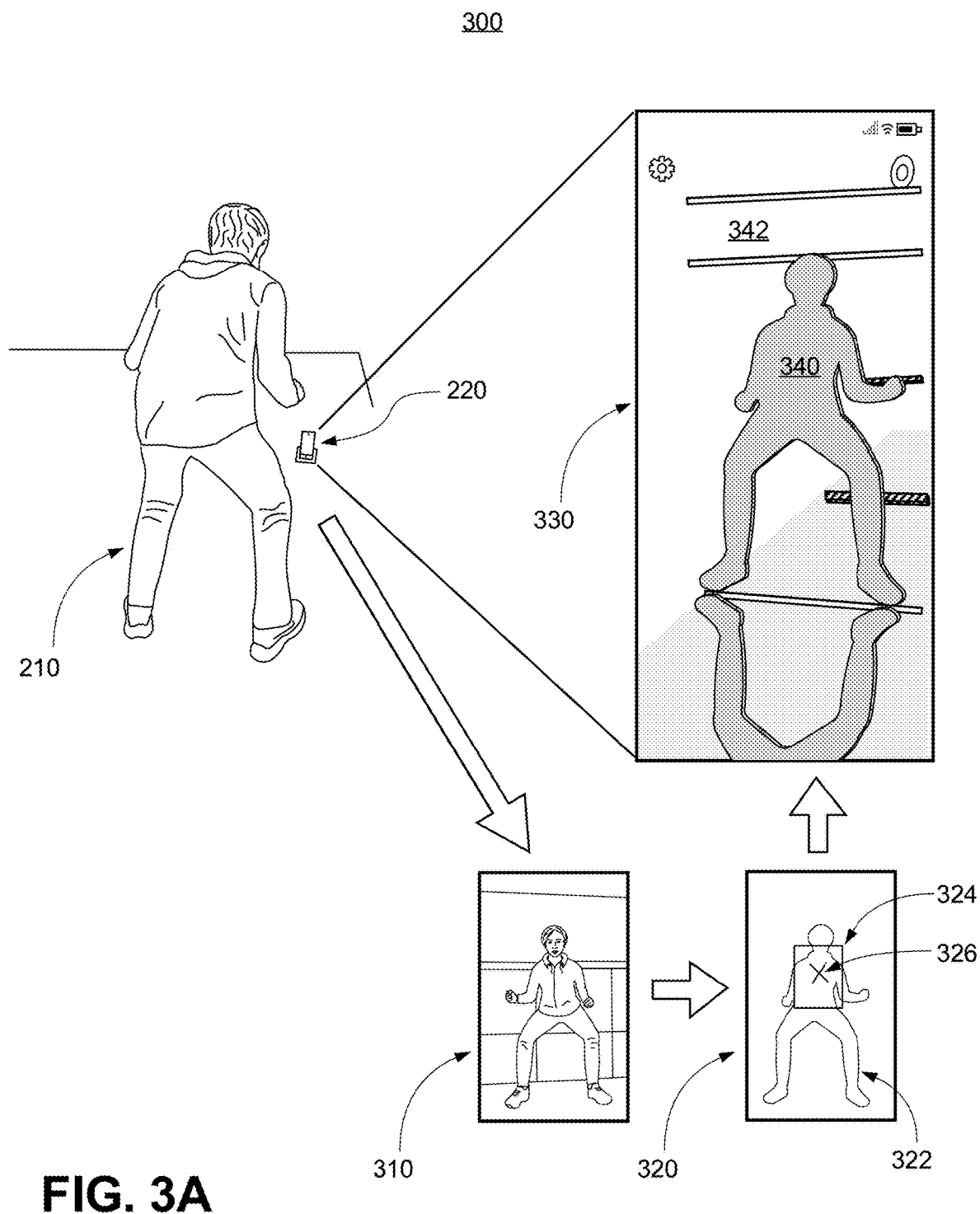
FIG. 3A is an illustration showing the user in FIG. 2 from the back, and what he sees on the mobile computing device that converts an image of him into a three-dimensional (3D) representation in a VR environment, according to some embodiments of the present invention.

FIG. 3A is an illustration 300 that shows user 210 in FIG. 2 from the back, and a screen capture 330 of what he sees on mobile computing device 220 that converts an image 310 the user into a three-dimensional (3D) representation 340 in a VR environment 342, according to some embodiments of the present invention. An intermediate diagram 320 illustrates an exemplary implementation in which user 210's two-dimension (2D) contour 322 is extracted after a user segmentation process based on a body bounding box 324 and a body center depth pixel 326.

Figure 3B:
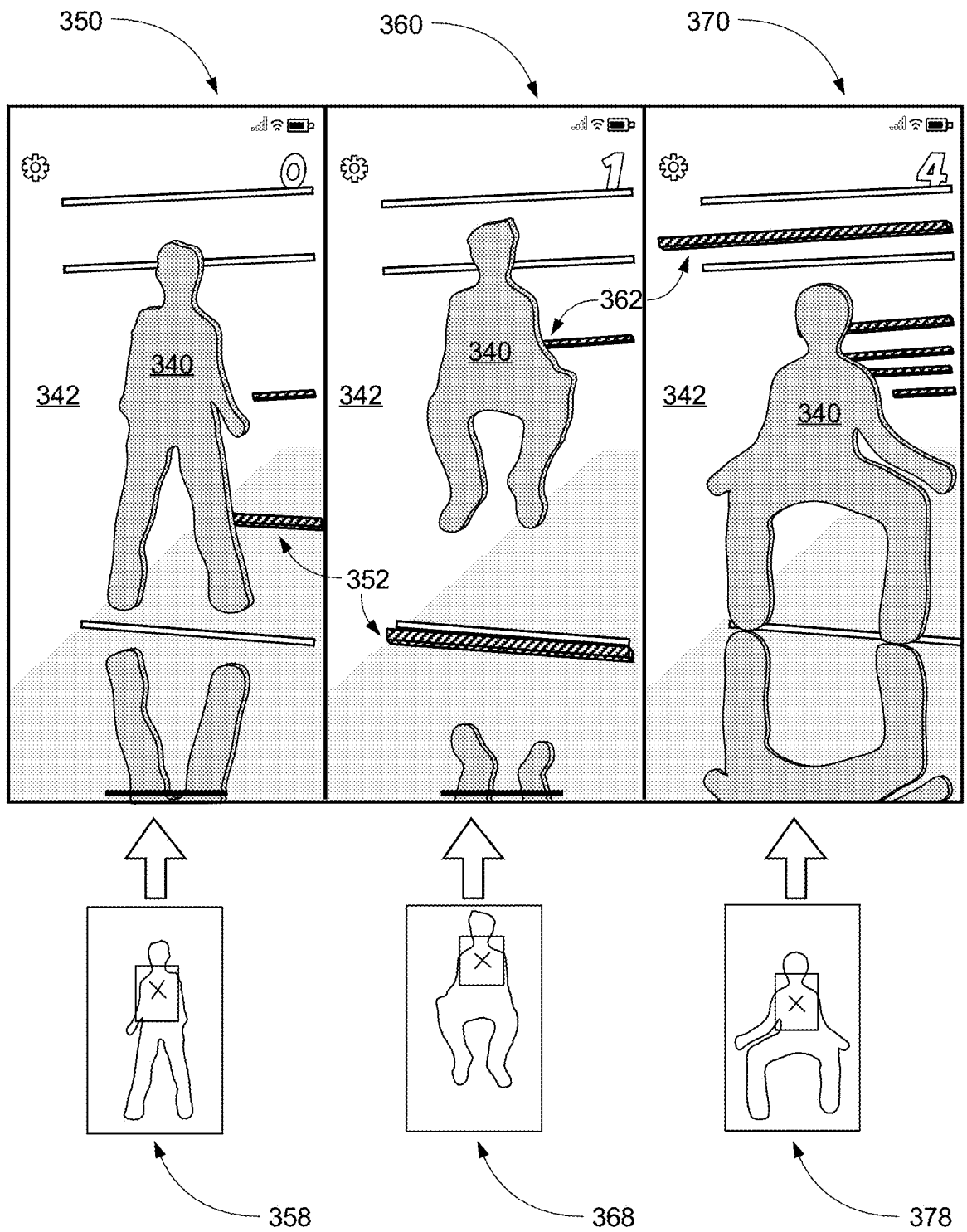
FIG. 3B shows additional illustrative screen captures of the user's 3D representations in the VR environment, according to some embodiments of the present invention.

FIG. 3B shows additional illustrative screen captures 350, 360 and 370 of user 210's 3D representation 340 in the VR environment 342, according to some embodiments of the present invention. Also shown are respective intermediate diagrams 358, 368, and 378 of corresponding user contours, body bounding boxes, and body center depth pixels that may be used in 3D model generation. In this illustrative example, the user is playing a VR game where his 3D representation 340 jumps over virtual floor bars such as 352 and ducks virtual head bars such as 362 that move at a selected speed towards the 3D representation 340 along given perspective tracks. As the user moves through space in his own physical environment (e.g., stand, jump, squat), his 3D virtual representation 340 moves in the virtual environment accordingly.

Figure 4:
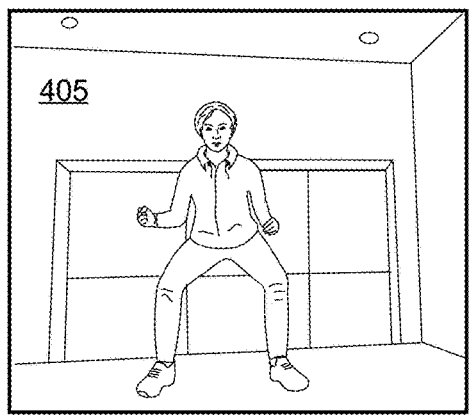
FIG. 4 shows an illustrative diagram of representative process steps for constructing the 3D model representation of the user in the virtual environment, using a mobile computing device, according to some embodiments of the present invention.
Figure 4:
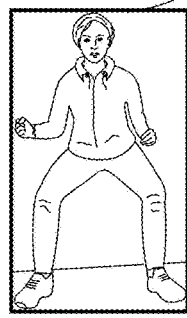
Figure 4:
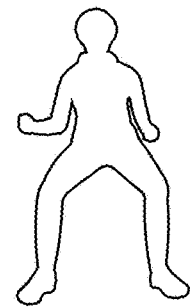
Figure 4:
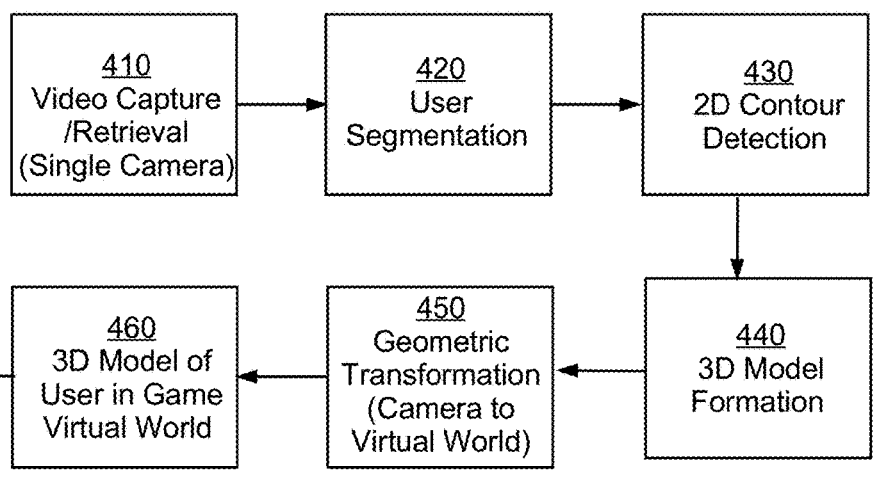
Figure 4:
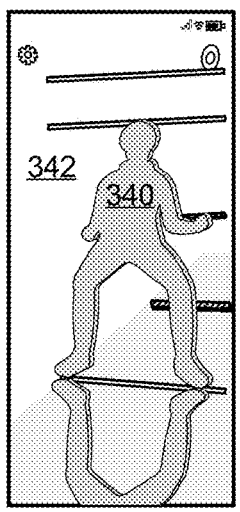
Figure 4:
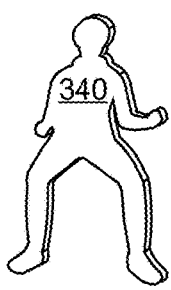
Figure 4:
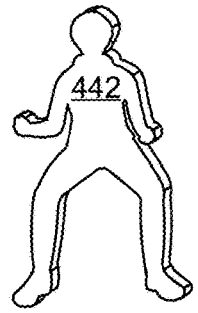

FIG. 4 shows an illustrative diagram 400 of representative process steps for constructing a 3D model representation such as 340 of the user in a virtual environment such as 342, using a mobile computing device, according to some embodiments of the present invention. Also shown in FIG. 4 above or below each process step are correspondingly processed image data, which are for illustrative purposes only and do not limit the scope of the invention to the particular operations and/or particular parameters shown.

In various embodiments, the disclosed methods and systems can provide one or more of the following process steps to enable the conversion of an input RGB image or a video frame of the user into a full body VR representation described herein utilizing computer vision algorithms.

At step 410, the system as disclosed herein receives or retrieves a full-body image 405 of the user in his physical environment, wherein the image is captured by a single RGB camera. In some embodiments, the RGB camera may be an RGB-D camera. At step 420, user segmentation may be performed on RGB data or depth data to extract the user from the image background. 2D contour detection is performed at step 430, and a 3D model 442 may be formed at step 440, for example using a 2D to 3D extrusion method. At step 450, a geometric transformation is performed to project the camera representation 442 to the VR environment representation 340, with appropriate scales, perspectives, offsets, and/or other rendering parameters. At step 460, the full body VR representation 340 is positioned into the VR environment 342 and the output on the computing device display is shown schematically as a screen capture 465.

In some embodiments, the disclosed systems may perform an additional step 470 for graphical rendering, physical simulation, and contact testing of the 3D model placed in the virtual space, for example as supported by SceneKit in iOS, or Unity 3D, or any other physics simulation engine. This additional step may be completed according to goals of the VR application. For example, to determine if the 3D model has touched an incoming virtual bar in the VR game shown in FIG. 3B.

Figure 5:
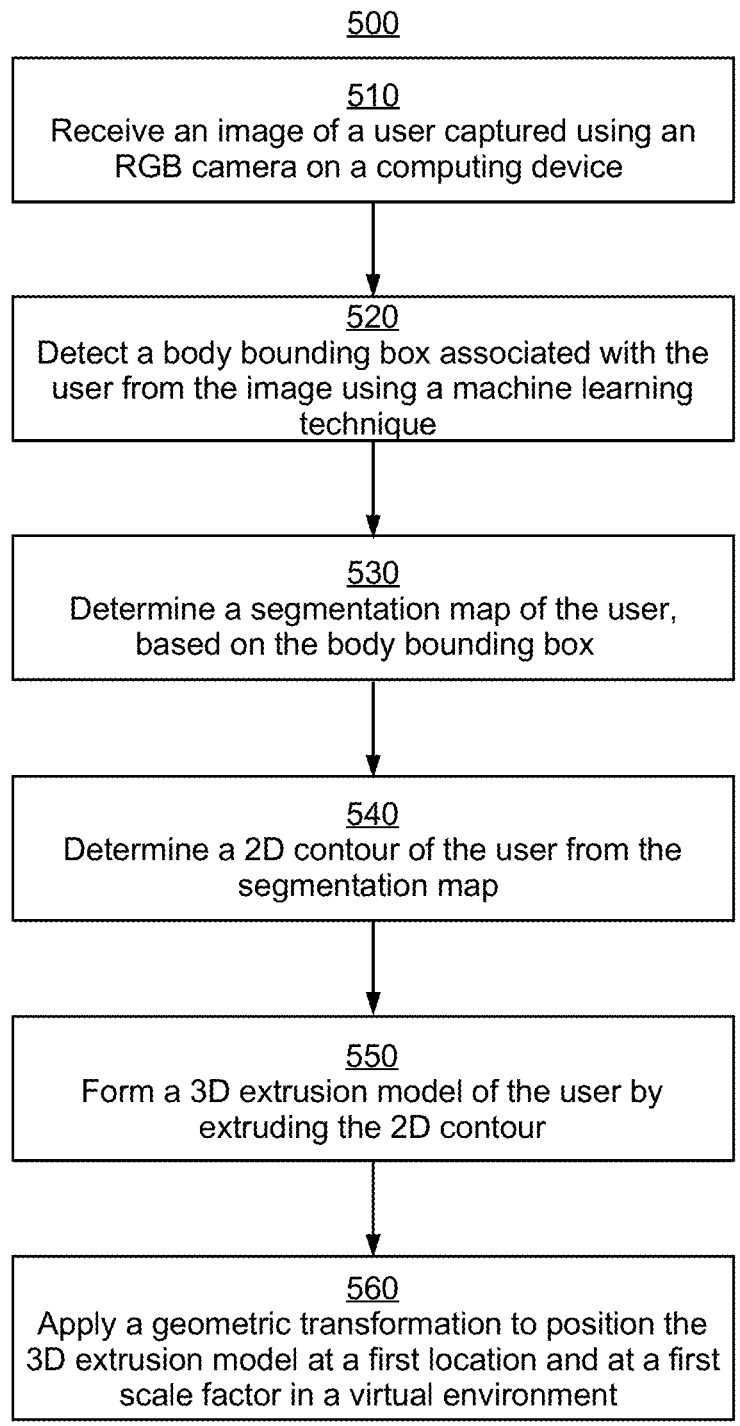
FIG. 5 is an exemplary flow diagram illustrating example operations for constructing a 3D virtual representation of a user in a given virtual environment, according to some embodiments of the present invention.

FIG. 5 is an exemplary flow diagram 500 illustrating example operations for constructing a 3D virtual representation of a user in a given virtual environment, according to some embodiments of the present invention.

In a first step 510, the disclosed systems may be configured to receive or retrieve an image of a user captured using an RGB camera on a computing device. In various embodiments, the disclosed systems may receive single images or may be configured to process camera frames into individual images. As disclosed herein, the disclosed systems can use either RGB or RGB-D cameras. RGB-D cameras are capable of measuring a depth map associated with the RGB data. The RGB-based or RGB-D cameras may include a camera equipped with a standard complementary metal-oxide-semiconductor (CMOS) based sensor device through which the colored images of persons and objects can be acquired via color-sensitive (e.g., red, green, and blue sensitive) sensor arrays. In some embodiments, the camera may include various intrinsic parameters (e.g., focal length, image sensor format, principal point, lens distortions, and/or the like associated with the camera), and the disclosed systems may be configured to modify one or more of such parameters to obtain images and videos of the users and/or objects for analysis. In some embodiments, the computing device on which the RGB camera is resided may include various sensors, such as an accelerometer, a location-determination unit (e.g., including, but not limited to, a lidar-based sensor, a Global positioning system (GPS) based sensor, etc.), and/or the like.

At step 520, a body bounding box associated with the user may be detected or determined from the RGB image, using a trained machine learning technique, such as a trained neural network. Bounding boxes are commonly used in computer vision and machine learning. They are rectangular-shaped boxes that localize or define the spatial location of an object within an image. A bounding box outlines a detected target item in a box with border coordinates, and may be determined manually (e.g., by a human annotator during training data generation for a machine learning system) or automatically (e.g., by a trained machine learning algorithm). In the present disclosure, a body bounding box is a bounding box that outlines the user's full body, or outlines one or more body parts (e.g., upper torso, upper body, lower body). For example, bounding box 422 in FIG. 4 is a full body bounding box that encloses the user's entire body; body bounding box 324 in FIG. 3A encloses the user's upper torso/upper body only.

At step 530, a segmentation map is generated or determined for the user, from RGB or depth data, and based on the body bounding box. Images are made up of gridded pixels. Image segmentation is the process of classifying an image at the pixel level into different categories or classes that may represent different objects or instances of objects. For example, a binary segmentation map for a user provides a silhouette having edges that match the outline of the user.

In some implementations where only RGB data is available without depth information, the body bounding box may enclose the user's full body, and a segmentation map of the player's body may be estimated with a trained segmentation neural network from the RGB data inside the full body bounding box.

Figure 6:
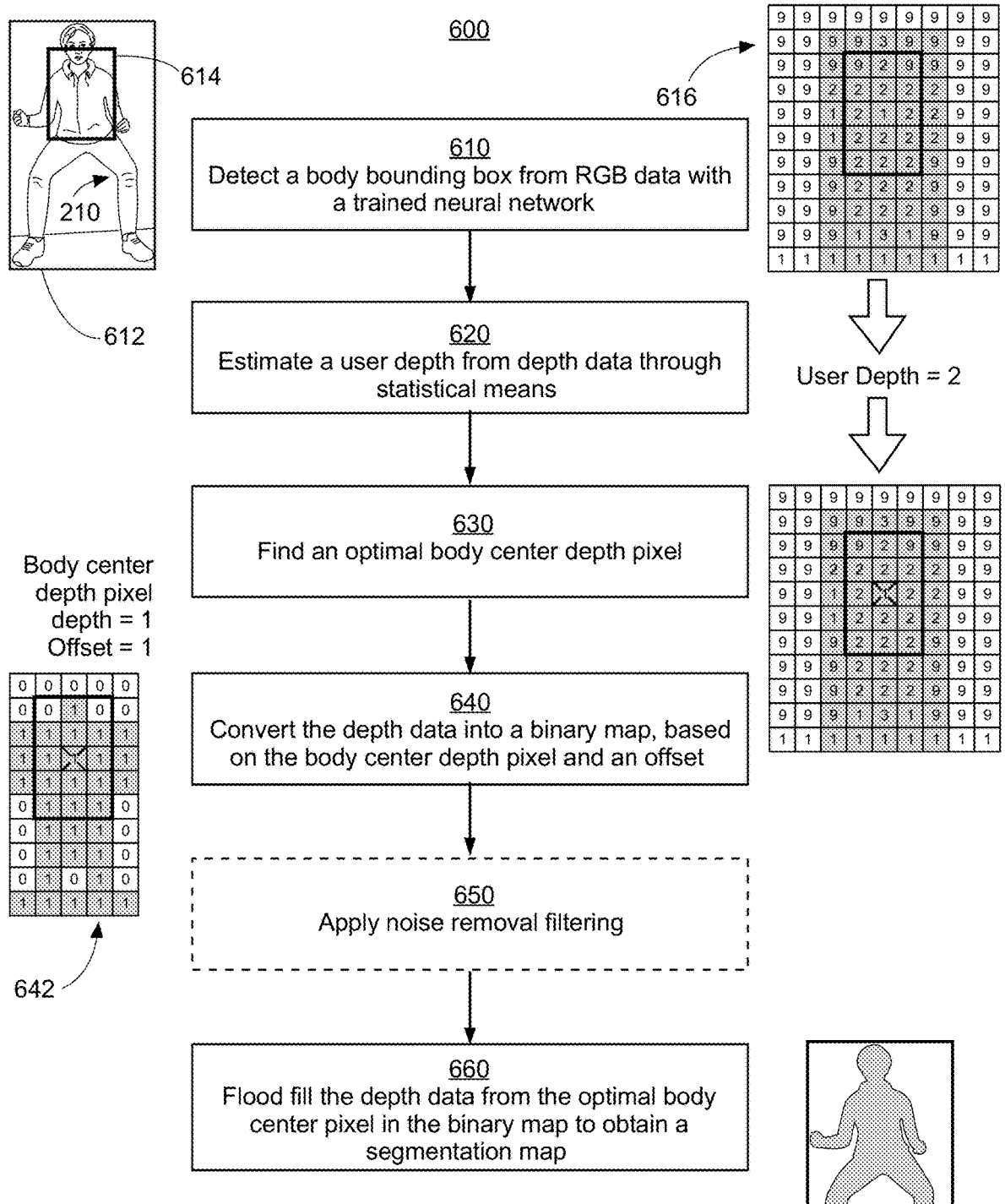
FIG. 6 is an exemplary flow diagram for generating a segmentation map from RGB-D data, according to some embodiments of the present invention

In some embodiments where an associated depth map is available, a user segmentation map may be generated without the use of complex segmentation neural networks that require prior training. Instead, the methods and systems as disclosed may use statistical means and optimization techniques on the depth data directly. FIG. 6 provides an exemplary embodiment for user segmentation using RGB-D data.

At step 540, a two-dimensional (2D) contour may be determined from the user segmentation map. In various embodiments, the disclosed systems may use any suitable structural analysis algorithm to find the 2D contour of the segmentation map as a list of 2D points. For example, the disclosed systems may implement a function similar, but not necessarily identical to, a findContour( ) function in OpenCV. Further, the disclosed systems may apply a contour simplification technique if needed. For example, the disclosed systems may implement a function similar, but not necessarily identical to, an approxPolyDP( ) function in OpenCV.

At step 550, the disclosed systems may form a 3D model of the user from the 2D contour, for example, by extruding the 2D contour directly without any tapering. Furthermore, to form a smooth 3D model, the disclosed systems may first convert a polygonal path to a smooth 2D path composed of cubic Bezier curves with control points derived from the vertexes in the polygonal path, before extruding the smooth 2D path. In some embodiments, the disclosed systems may apply a mesh smoothing technique to obtain a smooth 3D model extruded from a 2D contour.

At step 560, the disclosed systems may perform a geometric transformation on the 3D extrusion model to orient the model in a virtual world in a predetermined manner. More specifically, the 3D model may initially be defined in the camera frame's coordinate. Correspondingly, the disclosed systems may apply geometric transformation to put the 3D extrusion model at the right position, perspective, and scale in the given virtual world. In some embodiments, as the 3D model is generated from images captured by a camera that is oriented in an opposite direction than the user, the disclosed systems may perform a horizontal flip of the 3D model as part of the geometric transformation so that the 3D model appears as a mirrored image of the user on the screen.

Again, in some embodiments, the disclosed systems may perform additional graphical rendering, physical simulation, and contact testing of the 3D model placed in the virtual space, for example as supported by SceneKit in iOS, or Unity 3D, or any other physics simulation engine.

Furthermore, in yet some embodiments, the 2D contour as determined in step 540 may undergo geometric transformation in step 560 directly, without 3D model generation. That is, a 2D silhouette or profile may be generated from the depth map in real-time as disclosed, and projected into a given virtual environment for the user to see and control.

FIG. 6 is an exemplary flow diagram 600 for generating a segmentation map from RGB-D data, according to some embodiments of the present invention. Also shown in FIG. 6 beside each process step are correspondingly processed image data, which are for illustrative purposes only and do not limit the scope of the invention to the particular operations and/or particular parameters shown.

In this illustrative embodiment, the disclosed systems may first detect and generate, at step 610, one or more body bounding boxes associated with the user from RGB data, using a machine learning technique such as a trained neural network. For example, a first full body bounding box 612 separates the user 210 from other objects in his physical environment, while a second partial body bounding box 614 focuses on the user's upper torso or upper body. Different embodiments of the present invention may configure the number and size of body bounding boxes differently, depending on the target VR application, device processing power, desired segmentation accuracy in later steps, and other similar configurable parameters.

At step 620, the disclosed systems may estimate a user depth from depth data 616 through statistical means. For example, the entire set of depth data 616 or a part of the depth data 616 may be analyzed to calculate a descriptive statistic. Depth data 616 is an illustrative low-resolution depth map that corresponds to an RGB image of the user 210. The 10×5 shaded central rectangular portion of depth map 616 comprises depth pixels corresponding to RGB data inside body bounding box 612. The smaller 5×3 rectangular portion of the depth map 616 comprises pixels corresponding to RGB data inside body bounding box 614. The descriptive statistic calculated may measure a central tendency of the depth data inside a chosen body bounding box. For example, a user depth may be estimated as a median, percentile, or arithmetic mean of depth pixels inside a chosen body bounding box. From the 5×3 upper body bounding box, the user depth may be calculated as the median pixel value of 2.

At step 630, a single, optimal body center pixel may be determined, representing a body center or centroid for the user, as defined by some optimization conditions or cost functions. For example, from depth map 616, a body center depth pixel may be found by minimizing both a difference to the estimated user depth and a distance from a center of a chosen body bounding box. That is, if $(x, y)$ is the coordinate of the body center depth pixel to be determined, $D(x, y)$ is the depth at $(x, y)$, $(b_x, b_y)$ is the coordinate of the center of the body bounding box, and d is the previously estimated user depth, a cost function $C(x, y)=(x-b_x)^2+(y-b_y)^2+(D(x, y)-d)^2$ may be minimized to find an optimal body center depth pixel location. In the example shown in FIG. 6, the body center depth pixel coincides with the geometric center of the smaller body bounding box, and has a depth of 1.

After the body center pixel is found, the depth data may be segmented, based on the body center depth pixel and an offset. For instance, in the illustrative example shown in FIG. 6, at step 640, a thresholding technique may be used to convert the depth data into a binary map indicating whether each pixel is closer to the camera than the optimal body center depth pixel plus the offset. For example, with a body center depth pixel depth of 1, and a chosen offset of 1, the depth map may be converted into binary map 642, with or without appropriate cropping of the depth map based on the body bounding boxes. In various embodiments of the present invention, adjusting the depth offset has similar effects to adjusting the binarization depth threshold. Changing the offset effectively masks parts of the user's body at some chosen depth level so that body parts may be displayed selectively rather than entirely all the time. FIGS. 10A to 10F provide an illustrative example where the offset is significantly negative.

In some embodiments, the disclosed systems may apply optional noise removal filtering operations at step 650 on the binary map, for example, via a morphological transform.

Finally, at step 660, flood filling may be performed on the filtered binary map, starting and radiating from the optimal body center pixel to obtain a segmentation map. In some embodiments, flood filling may be applied to the depth map directly, also from the optimal body center pixel. That is, binarization and flood filling may be completed in a combined step. FIGS. 8A and 8B provide an illustration of the flood filling process.

Additionally, in some embodiments, the user is standing on a floor, and therefore, the floor may be included in the binary map 642. The disclosed systems may be configured to remove the floor by removing any rows in the binary map from the bottom up that are more filled beyond a predetermined threshold (e.g., filled more than a certain percentage, such as 80%). That is, the system may first determine whether a row in a bottom portion of the binary map has been flood filled to more than a predetermined threshold percentage, and in response to determining that the row has been flood filled to more than the predetermined threshold percentage, remove the row from the binary map.

Figure 7:
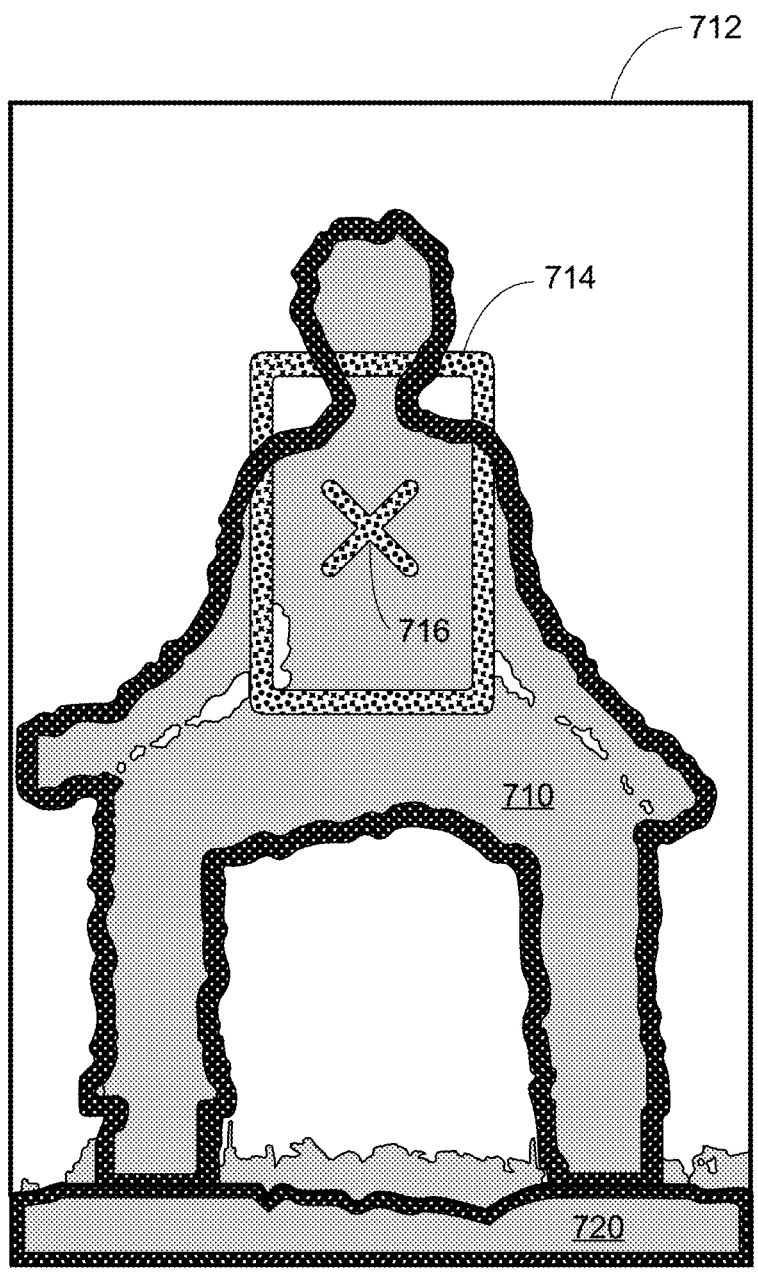
FIG. 7 is an illustrative segmentation diagram for an input RGB-D image, according to some embodiments of the present invention.

FIG. 7 is an illustrative segmentation diagram 700 for an input RGB-D image inside a bounding box 712, according to some embodiments of the present invention. The grayscale portion represents a user depth map, and the thickened outlines are segmentation boundaries. The user depth map may be converted into a binary map with pixels inside the segmentation boundaries set to 1, and otherwise set to 0. During floor removal, the grayscale floor portion 720 may be set to 0, and only the user portion 710 may remain. Also in this example, an upper body bounding box 714 is shown to have a body center depth pixel 716.

FIGS. 8A and 8B are respective depth and binary maps showing an illustrative flood-filling process from a center pixel having a depth of 1, with a threshold of ±1, according to some embodiments of the present invention. Here the depth map in FIG. 8A is flood filled and threshold to obtain the binary map in FIG. 8B.

Figure 9:
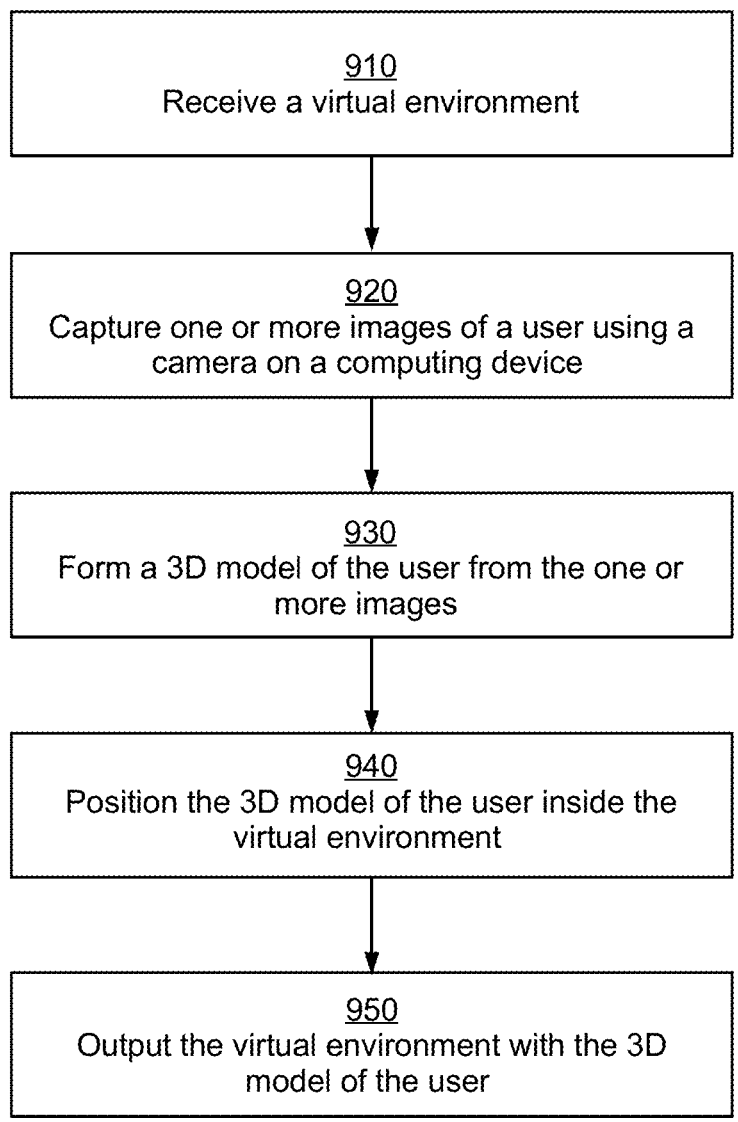
FIG. 9 is an exemplary flow diagram for generating a 3D model in a virtual environment, according to some embodiments of the present invention.
Figure 10A:
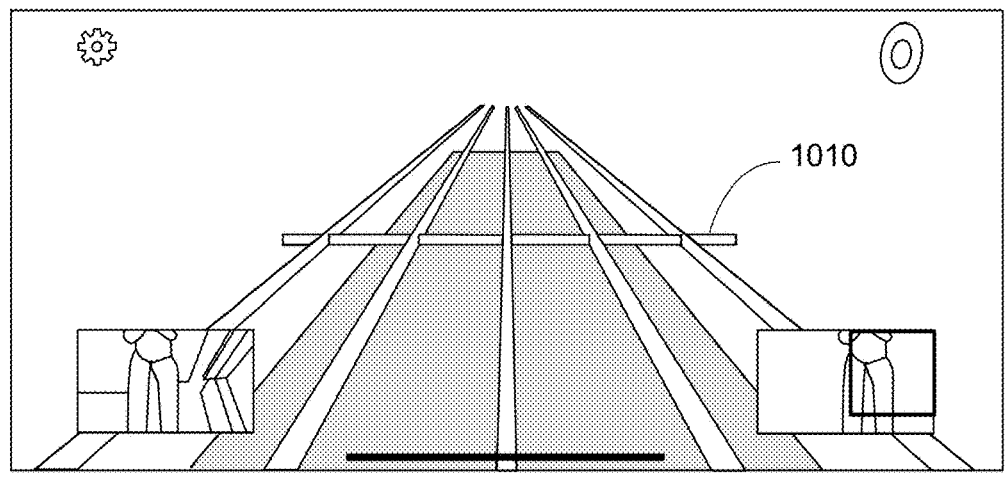
FIGS. 10A, 10B, 10C, 10D, 10E, and 10F are respective screen captures of an illustrative VR game, according to some embodiments of the present invention.
Figure 10B:
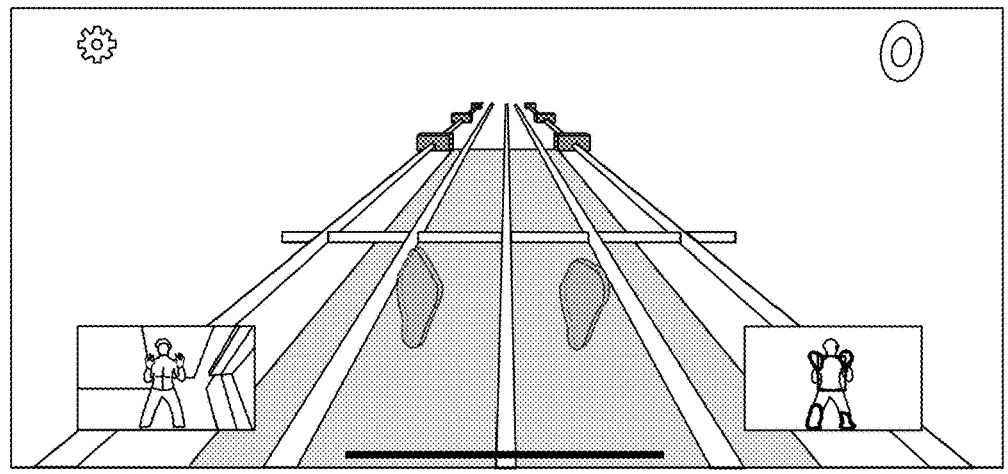
Figure 10C:
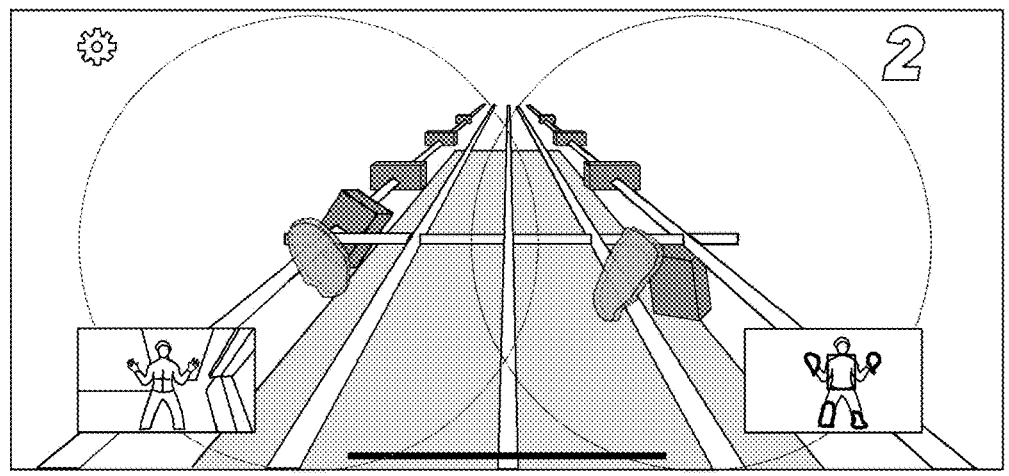
Figure 10D:
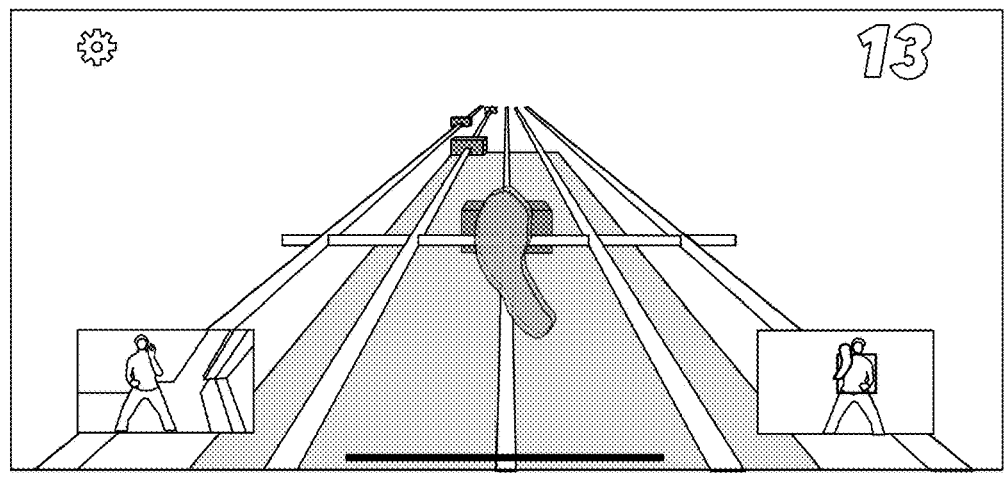
Figure 10E:
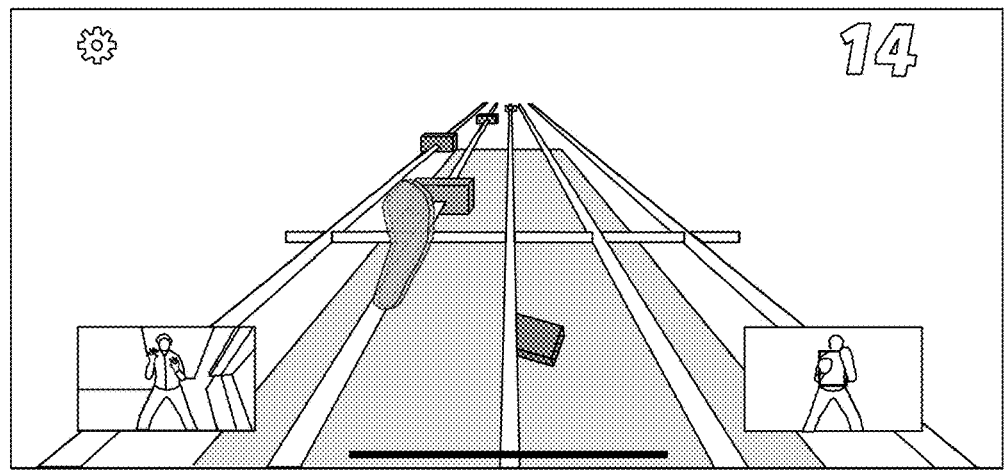
Figure 10F:
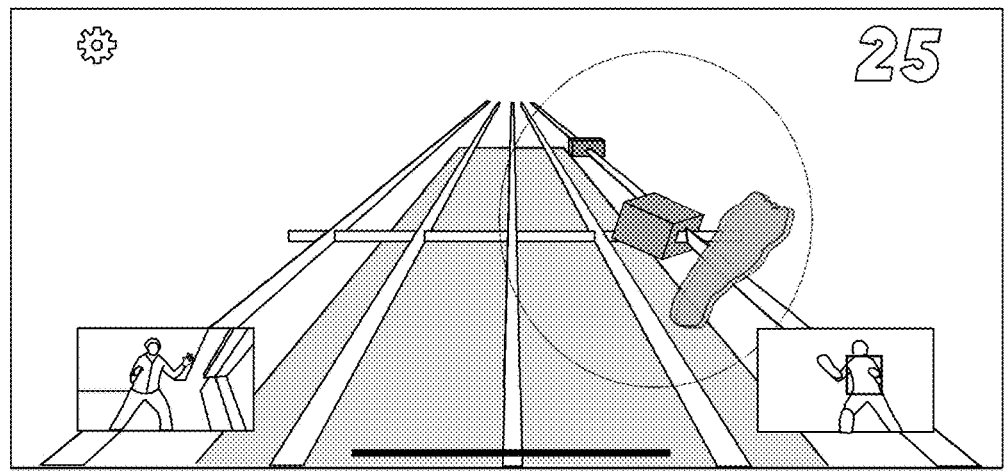
Figure 11A:
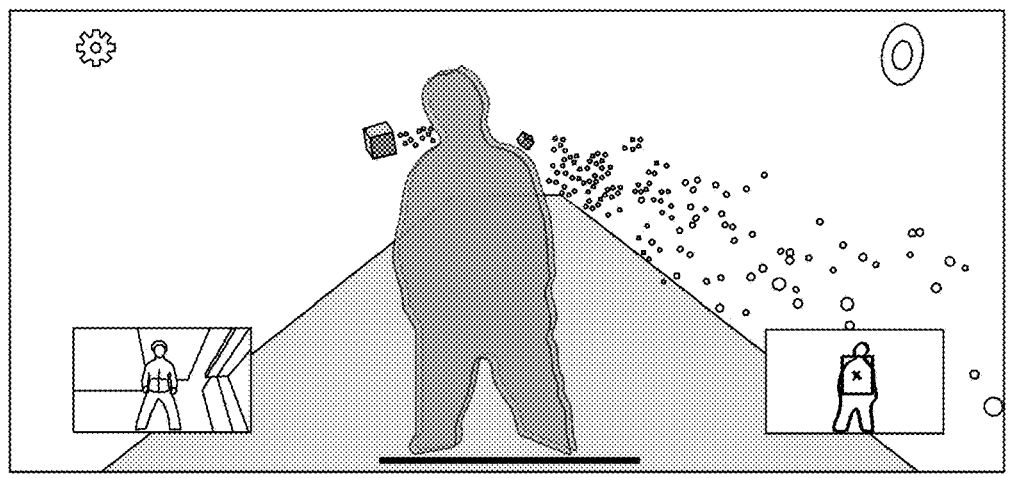
FIGS. 11A, 11B, 11C, 11D, 11E, and 11F are respective screen captures of another illustrative VR game, according to some embodiments of the present invention.
Figure 11B:
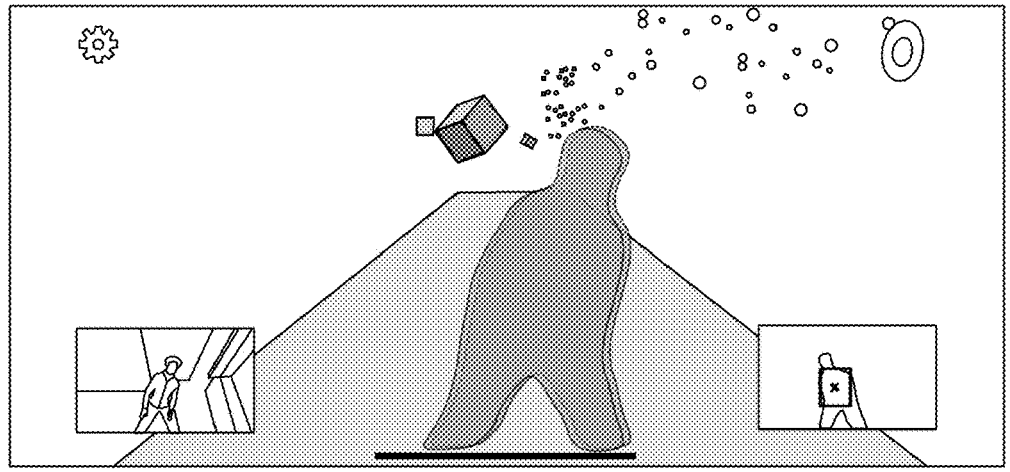
Figure 11C:
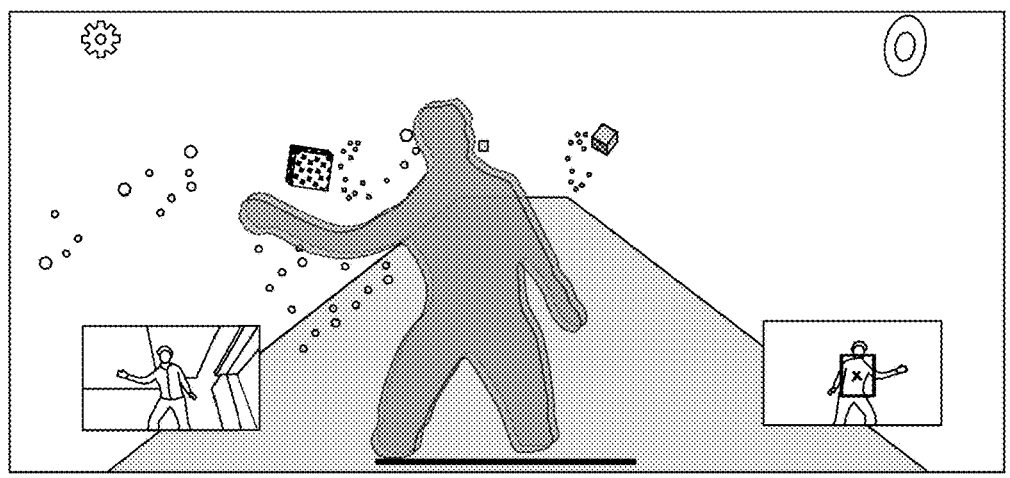
Figure 11D:
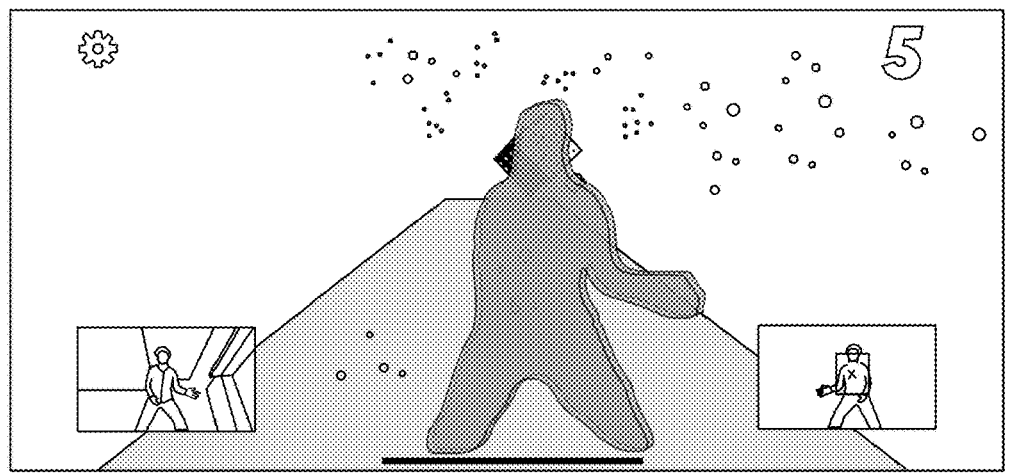
Figure 11E:
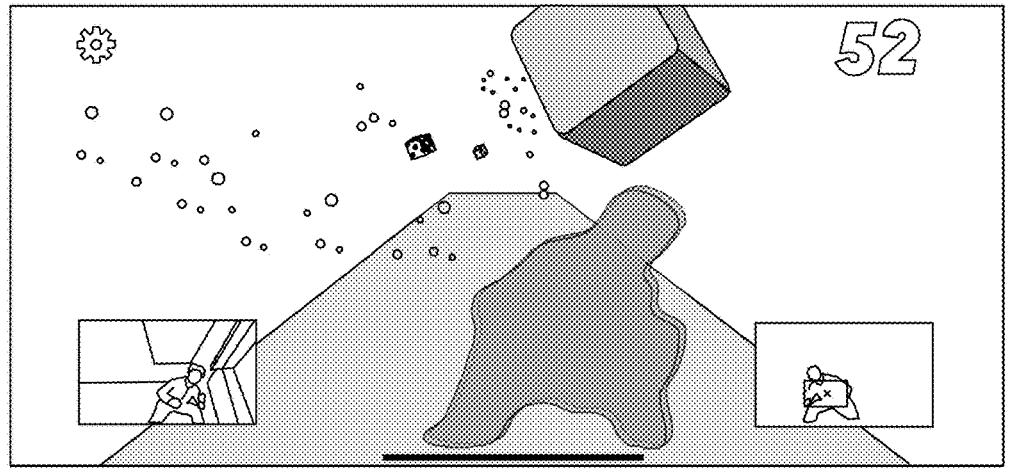
Figure 11F:
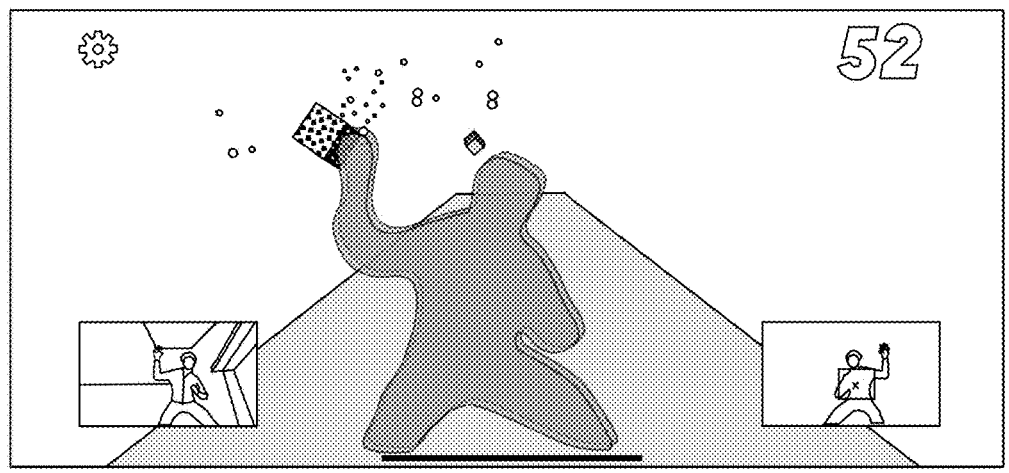

FIG. 9 is another exemplary flow diagram 900 for generating a 3D model in a virtual environment for a full body VR application, according to some embodiments of the present invention. At step 910, the disclosed systems may receive a target virtual environment for 3D virtual model placement. At step 920, the disclosed systems may capture one or more images of a user using a camera on a computing device. At step 930, the disclosed systems may form a 3D model of the user from the one or more images. As disclosed herein, the 3D model may be generated using one of several efficient computer vision algorithms. In a first example, a user segmentation map may be generated from RGB data using a trained segmentation neural network, and the segmentation map may be used to generate a 2D contour followed by a 3D extrusion model. In a second example, a user segmentation map may be generated from a depth map associated with the RGB data, using statistical means, depth and distance minimization, and depth thresholding. Again, the segmentation map may be used to generate a 2D contour followed by a 3D model generation step. In yet another example, a trained neural network may process RGB data to determine user posture and pose information, and a 3D virtual representation may be generated from a user posture, by using the user posture as a skeleton to generate 3D body avatars. Exemplary pose estimation modules based on convolutional neural networks are discussed with reference to FIGS. 15 to 19B. At step 940, the disclosed systems may position the generated 3D model of the user inside the virtual environment. Finally, at step 950, the disclosed systems may generate an output for display, or display the virtual environment with the 3D model of the user.

FIGS. 10A, 10B, 10C, 10D, 10E, and 10F are respective screen captures of an illustrative VR game, according to some embodiments of the present invention. In this VR game, blocks move towards the user from a distance along one of five tracks, and the user attempts to hit the blocks in the virtual world with his or her virtual hands when a block reaches a target bar 1010 in FIG. 10A. A point may be earned for each block hit. The five tracks may each correspond to a musical note, and the blocks may be spaced so that successive hitting of the blocks causes a musical tune or melody to be played. As disclosed herein, rendering of the moving virtual blocks along the virtual tracks, and contact testing of the user's virtual representation with the virtual blocks in the virtual world, may both be supported by existing physic simulation engines such as SceneKit in iOS, or Unity3D.

In these screen captures, on the bottom left are illustrative sub-diagrams represented RGB images of the user. On the bottom right are illustrative sub-diagrams representing segmentation maps and specific user body parts that are included in binary map conversion and 3D model generation.

In this illustrative example, the offset in binary map conversion may be significantly negative. For example, if the user's center depth is determined to be 3.0 meter, adding a −0.5 meter offset to the binarization threshold could result in a binary map that includes only the user's hands, which are significantly closer to the depth camera than the rest of the user's body. Such 3D "virtual hands" may be used in VR or AR games where the user reaches out and interacts with an virtual object.

Although the user's "virtual hands" shown in FIG. 10A to 10F are 3D extrusion models, in some embodiments, the 3D extrusion step may be optional or omitted, such that 2D contours or silhouettes of the hands may be projected directly into the virtual environment.

FIGS. 11A, 11B, 11C, 11D, 11E, and 11F are respective screen captures of yet another illustrative VR game, according to some embodiments of the present invention. In this VR game, blocks fly towards the user from a distance. The user attempts to hit blocks having a first color, and to avoid blocks having a second color. Hitting of the blocks may be done with any body part, such as hands, arms, head, and torso. Again, rendering of the moving virtual blocks and contact testing of the user's virtual representation with the virtual blocks in the virtual world may be supported by existing physic simulation engines such as SceneKit in iOS, or Unity3D. On the bottom left of each screen capture are sub-diagrams represented RGB images of the user. On the bottom right of each screen capture are sub-diagrams representing segmentation maps and the specific user body parts that are included in binary map conversion and 3D model generation.

Applications of Full Body Virtual Reality to Physical Training and Fitness

In various embodiments, the disclosed systems may be used in connection with training and/or performance training activities performed at least in part using the virtual representation of the user, for example, for physical activities and/or sports.

It would be understood by persons of ordinary skill in the art that physical training and fitness activities discussed in this disclosure broadly refer to any physical exercise, workout, drill, or practice that improve a user's fitness and skill levels to better his or her ability to perform a given physical activity or sport. Training activities thus disclosed can maintain, condition, correct, restore, strengthen, or improve the physical ability, power, agility, flexibility, speed, quickness, reaction, endurance, and other physical and technical skills necessary for a physical activity or sport. Such a physical activity or sport may be competitive or non-competitive in nature, with or without specific goals or challenges, and may or may not be scored according to specific rules. A user of the system as disclosed herein may also be referred to as a player, including in non-competitive activities such as rehabilitative physical therapies and occupational therapies. A training session may involve one or more individual players. During a training session, individual skills such as power, speed, agility, flexibility, posture, balance, core strength, upper and lower-body strength, rhythm, swing, stroke, flick, running, stopping, dribbling, juggling, passing, catching, throwing, smashing, tackling, shooting, jumping, sprinting, serving, and goalkeeping may be isolated, broken down into specific movements, and worked upon. Such skills may be inter-dependent. For example, better core strength may lead to better stance and balance, and better body-eye and hand-eye coordination may lead to faster speed, shorter stopping time, and better control of a ball. Some training activities are tailored for specific demands of a particular sport. Embodiments of the present invention may be used for interactive virtual coaching in ball sports as well as other types of sports or physical activities, including but not limited to, basketball, soccer, baseball, football, hockey, tennis, badminton, juggling, archery, softball, volleyball, boxing, canoeing, kayaking, climbing, cycling, diving, equestrian, fencing, golf, gymnastics, handball, judo, karate, modern pentathlon, roller sport, rowing, rugby, sailing, shooting, swimming, surfing, table tennis, taekwondo, track and field, triathlon, water polo, weightlifting, wrestling, squash, wakeboard, wushu, dancing, bowling, netball, cricket, lacrosse, running, jogging, yo-yo, foot bagging, hand sacking, slinky, tops, stone skipping, and many other types of sports, games, and other activities in a similar fashion.

As noted, some applications of the disclosed systems include training. The physical activities and/or sports being trained for can include, but not be limited to, any suitable type of physical games played in the real world, such as on a court, field, trail, and/or the like. Further, interactivity with a virtual and/or augmented world provides training opportunities for specific skills and techniques and physical activities and/or sports that at least partially interface with such domains and accordingly, the disclosed systems can be configured to operate within such domains. In some embodiments, another level of interactivity may exist among one or more users linked through a network, where multiple users or players may train together at the same time, and training results may be compared across time. Accordingly, the disclosed systems can be configured to operate with group activities with multiple users, which may not necessarily have to be collocated or performing one or more activities (e.g., training sessions, games, drills, etc.) at substantially the same time.

As with any multi-player VR games, when multiple players participate in physical training together, each player may be captured by separate cameras on separate computing devices, but the resulting 3D models may be projected into the same virtual space and displayed to all participating users. The geometric transformation as disclosed herein may take into account of all players present to ensure the relative positioning and scaling. In addition, the presentation of the 3D models may be different for each player, depending on respective viewing perspectives.

Other Applications of Full Body Virtual Reality

There are many other applications of the present invention for full body VR, including games, control of computing devices, manipulation and display of data, interactive social media with VR, and so forth. For example, a multi-player setup may be used in virtual teaching of physical education, where 3D models of individual students are projected into the same virtual gym to participate in live team games, and where the PE teacher can ensure students are participating in full-body movements by looking at the efficiently generated 3D virtual representations of individual students. In another example, a user's virtual hand may be displayed over a virtual computer keyboard so that the user is aware of the keystrokes being made to minimize input errors.

NEX Platform

Figure 12:
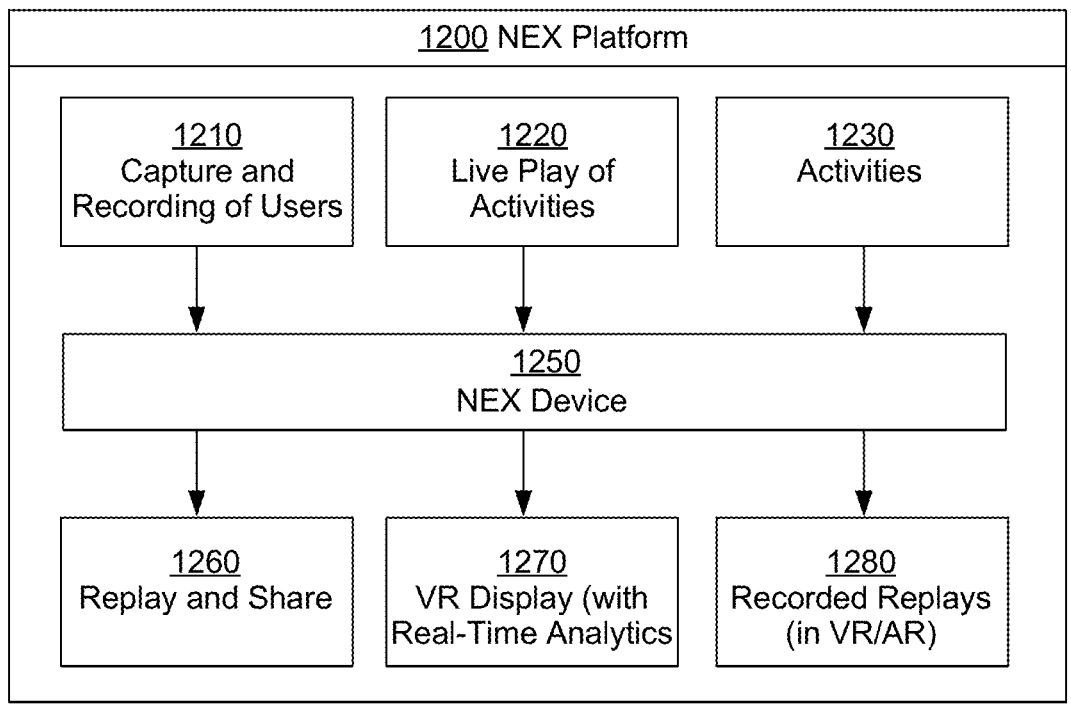
FIG. 12 is a schematic diagram illustrating a NEX platform, according to one embodiment of the present invention.

While the present invention has a multitude of applications, some embodiments of the present invention may be used to facilitate physical training and/or fitness sessions together with other computer vision and artificial intelligence-based application on the NEX platform. Accordingly, and for context only, FIG. 12 is an illustrative schematic diagram illustrating functionalities provided by an extended NEX platform 1200, according to one embodiment of the present invention. Live motions 1220 may be processed in real-time by a NEX computing device 1250 to generate real-time virtual representations in a virtual display 1270, possibly with additional real-time analytics such as game scores and/or training analytics. In some embodiments, NEX platform 1200 may capture activities 1230 and provide later replay 1280 in a VR or an AR setup. Furthermore, NEX platform 1200 may receive on-demand capture and recordings 1210 of past activities, such as training and/or fitness sessions, for post-processing within NEX computing device 1250, and/or instant or on-demand replay 1260 in VR or AR setups, and for content sharing.

Although NEX computing device 1250 as shown in FIG. 12 serves as the core for NEX platform 1200, in some embodiments, NEX platform 1200 may be networked among multiple user devices, where a NEX server 1250 may be connected to multiple camera-enabled user computing devices, each used to capture respective user or activity data, and for providing 3D virtual representation of captured users. Such data may be shared via NEX server 1250 among individual users, for participating in the same VR application.

Implementation Using Computer Program Products, Methods, and Computing Entities

Exemplary System Architecture

Figure 13:
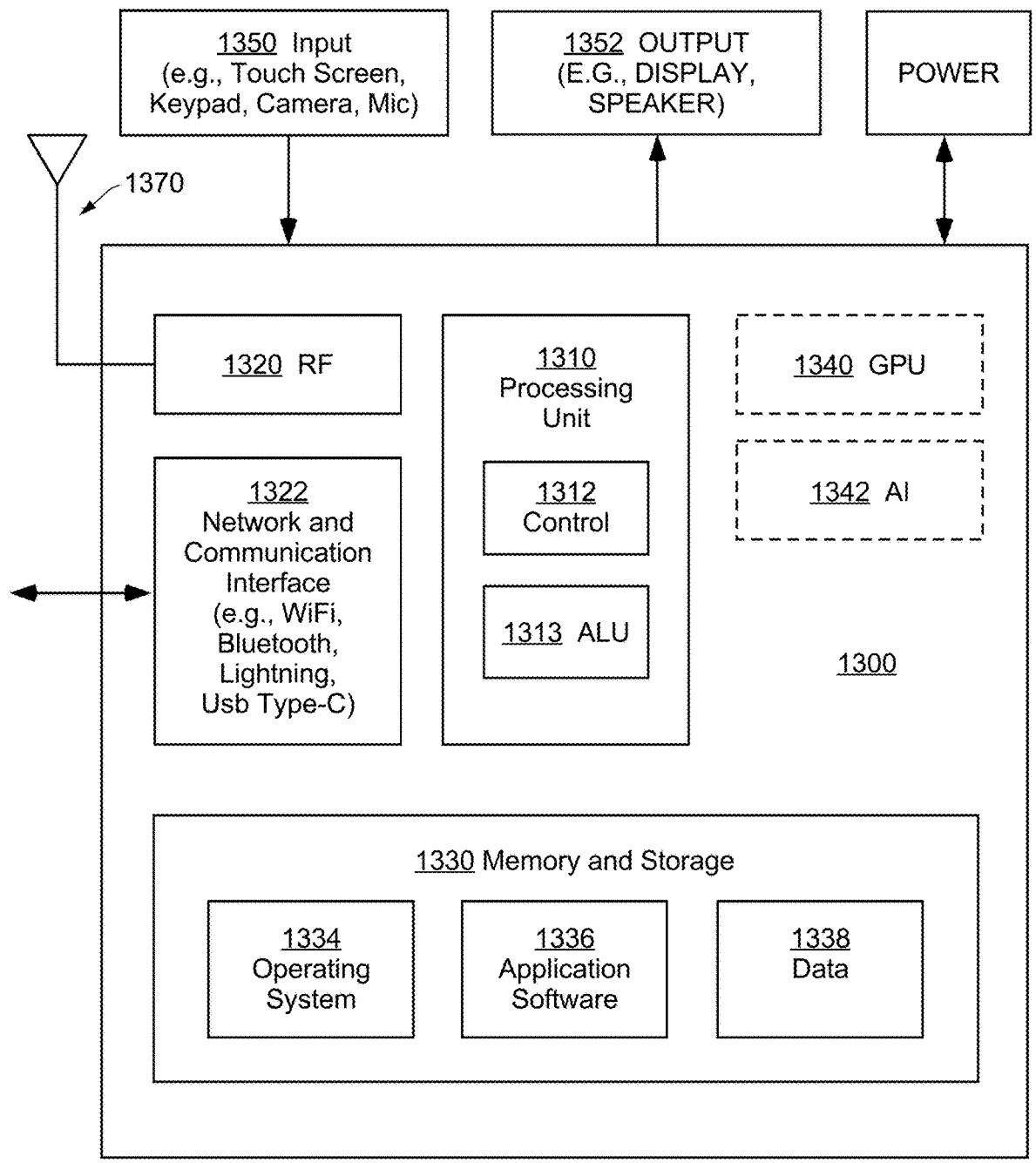
FIG. 13 is an exemplary schematic diagram of a user computing entity for implementing a full body VR application, according to exemplary embodiments of the present invention.
Figure 14:
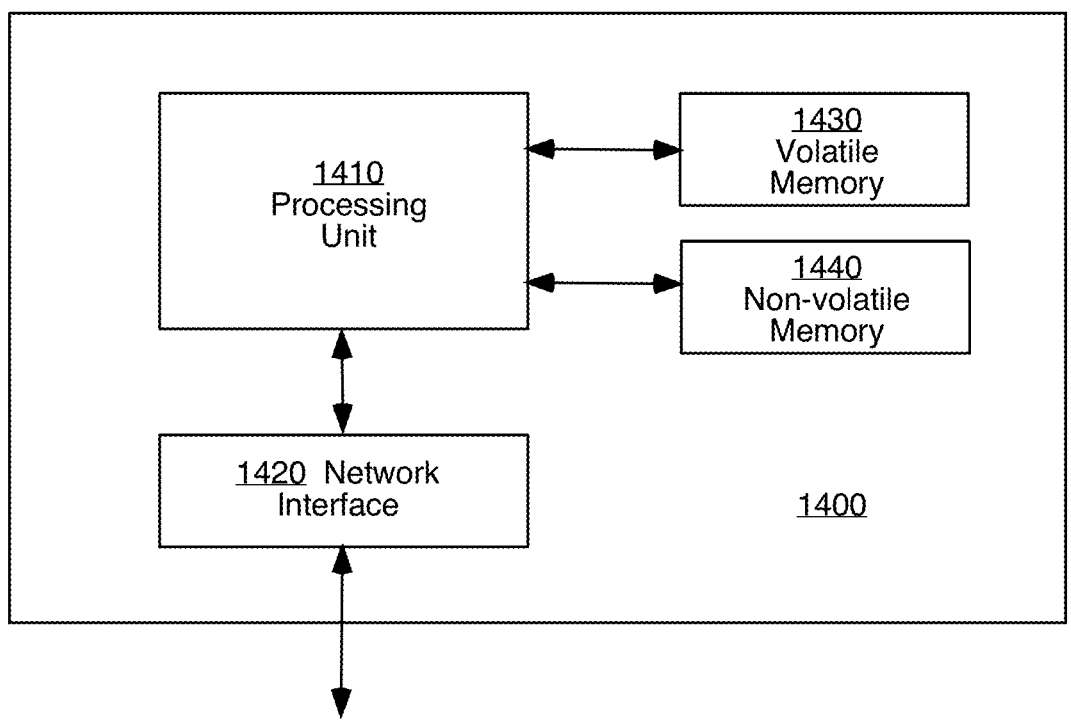
FIG. 14 is an exemplary schematic diagram of a management computing entity for implementing a full body VR application, according to exemplary embodiments of the present invention.

An exemplary embodiment of the present disclosure may include one or more user computing entities 1300, one or more networks, and one or more server or management computing entities 1400, as shown in FIGS. 13 and 14. Each of these components, entities, devices, systems, and similar words used herein interchangeably may be in direct or indirect communication with, for example, one another over the same or different wired or wireless networks. Additionally, while FIGS. 13 and 14 illustrate the various system entities as separate, standalone entities, the various embodiments are not limited to this particular architecture.

Exemplary User Computing Entity

FIG. 13 is an exemplary schematic diagram of a user computing device for implementing a full body VR application, according to exemplary embodiments of the present invention. A user operates a user computing device 1300 that includes one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, generating for display, monitoring, evaluating, comparing, and/or similar terms used herein interchangeably. In various embodiments, these functions, operations, and/or processes can be performed on data, content, information, and/or similar terms used herein interchangeably. Furthermore, in embodiments of the present invention, user computing device 1300 may be a mobile device, and may be operated by a user participating in an activity. On the other hand, a NEX server may be implemented according to the exemplary schematic diagram shown in FIG. 14, possibly in the cloud, and possibly with logically or physically distributed architectures.

As shown in FIG. 13, the user computing entity 300 may include an antenna 1370, a radio transceiver 1320, and a processing unit 1310 that provides signals to and receives signals from the transceiver. The signals provided to and received from the transceiver may include signaling information in accordance with air interface standards of applicable wireless systems. In this regard, the user computing entity 1300 may be capable of operating with one or more air interface standards, communication protocols, modulation types, and access types. More particularly, the user computing entity 1300 may operate in accordance with any of a number of wireless communication standards and protocols. In some embodiments, user computing entity 1300 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, the user computing entity 1300 may operate in accordance with multiple wired communication standards and protocols, via a network and communication interface 1322.

Via these communication standards and protocols, the user computing entity 1300 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 1300 can also download changes, add-ons, and updates, for instance, to its firmware, software (e.g., including executable instructions, applications, program modules), and operating system.

In some implementations, processing unit 1310 may be embodied in several different ways. For example, processing unit 1310 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 1310 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 1310 may be configured for a particular use or configured to execute instructions stored in volatile or non-volatile media or otherwise accessible to the processing unit. As such, whether configured by hardware or computer program products, or by a combination thereof, processing unit 1310 may be capable of performing steps or operations according to embodiments of the present invention when configured accordingly.

In some embodiments, processing unit 1310 may comprise a control unit 1312 and a dedicated arithmetic logic unit 1313 (ALU) to perform arithmetic and logic operations. In some embodiments, user computing entity 1300 may optionally comprise a graphics processing unit 1340 (GPU) for specialized image and video rendering tasks, and/or an artificial intelligence (AI) accelerator 1342, specialized for applications including artificial neural networks, machine vision, and machine learning. In some embodiments, processing unit 1310 may be coupled with GPU 1340 and/or AI accelerator 1342 to distribute and coordinate processing tasks.

In some embodiments, user computing entity 1300 may include a user interface, comprising an input interface 1350 and an output interface 1352, each coupled to processing unit 1310. User input interface 1350 may comprise any of a number of devices or interfaces allowing the user computing entity 1300 to receive data, such as a keypad (hard or soft), a touch display, a mic for voice/speech, and a camera for motion or posture interfaces. The camera may capture RGB or RGB-D data for 3D model construction. Alternatively, RGB or RGB-D data may be received via communication interfaces 1320 or 1322. User output interface 1352 may comprise any of a number of devices or interfaces allowing user computing entity 1300 to provide information to a user, such as through the touch display, or a speaker for audio outputs. In some embodiments, output interface 1352 may connect user computing entity 1300 to an external loudspeaker or projector, for audio or visual output.

User computing entity 1300 may also include volatile and/or non-volatile storage or memory 1330, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 1334, application software 1336, data 1338, databases, database instances, database management systems, programs, program modules, scripts, source code, object code, byte code, compiled code, interpreted code, machine code, executable instructions, and/or the like to implement the functions of user computing entity 1300. As indicated, this may include a user application that is resident on the entity or accessible through a browser or other user interface for communicating with a management computing entity and/or various other computing entities.

In some embodiments, user computing entity 1300 may include location determining aspects, devices, modules, functionalities, and/or similar words used herein interchangeably. For example, user computing entity 1300 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 1300 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

In a session, a user computing entity 1300 may be deployed (e.g., installed; configured; accepted; installed and accepted; configured and accepted; installed, configured, and accepted; or the like) in an area that includes players and/or game equipment. In some embodiments, at least one input device on user computing entity 1300 may collect or may be configured to collect information (e.g., data, metadata, and/or signaling) indicative of operational features of the area for analysis by processing unit 1310. For example, computer vision algorithms as implemented on user computing entity 1300 may be configured to detect the floor, location of court lines, field boundaries, one or more balls, or goal posts in an input video as captured by an input camera device.

In some embodiments, a system for implementing the full body VR application may include at least one user computing device such as a mobile computing device and optionally a mounting apparatus for the at least one mobile computing device. The mounting apparatus may be a tripod or a kickstand, and may mount the electronic device with a camera of the user computing device positioned to monitor an area. In some embodiments, the user computing device may be hand-held or put on the ground leaning against certain articles such as a water bottle. In some embodiments, the system further comprises a sound device, for example, earbuds (e.g., wireless earbuds) or a speaker system (e.g., a public address (PA) system) coupled to the at least one user computing device. The sound device may serve to provide instruction and feedback regarding a session to the user. In some embodiments, the system optionally comprises an optical device such as a projector, a projection lamp, a laser pointing system, a jumbotron, a television screen, or the like.

In some embodiments, user computing entity 1300 may communicate to external devices like other smartphones and/or access points to receive information such as software or firmware, or to send information (e.g., analytics, statistics, scores, recorded video, etc.) from the memory of the user computing device to external systems or devices such as servers, computers, smartphones, and the like.

In some embodiments, two or more users may establish a connection between their computing devices using a network utilizing any of the networking protocols listed previously. At least two of the users may be in geographically different areas. In some embodiments, the user computing devices may use a network interface such as 1322 to communicate with various other computing entities, such as by communicating data, content, information, and/or similar terms used herein interchangeably that can be transmitted, received, operated on, processed, displayed, stored, and/or the like.

In some embodiments, data such as statistics, scores, and videos may be uploaded by one or more user computing devices to a server such as shown in FIG. 14 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

In some embodiments, audio generated by a user computing device and/or audio generated by one or more users may be used to facilitate an interactive full body VR session. In some embodiments, audio may be used to (i) direct users to particular positions on areas (with further audio feedback to help the users locate themselves more accurately), (ii) inform users about a motion or action that a user needs to do as part of a VR application (e.g., hit a virtual object, perform an exercise such as jumps, and the like), (iii) provide feedback to the user (e.g., to inform them if the users are making a wrong move, running out of time, have successfully completed a given movement, or achieved a particular score), or (iv) report on the progress of the session (statistics, leaderboard, and the like). In some embodiments, speech recognition and corresponding responses (e.g., audio, visual, textual, etc. responses) may also be used to facilitate the session by allowing users to set options, correct mistakes, or start or stop the session.

In some embodiments, artificial intelligence-based computer vision algorithms may be used to perform at least one of the following: (i) ensure that users are located where they should be, (ii) determine when/if users successfully complete a body movement task, (iii) rank or score the quality of users' motion/action with respect to the virtual application, and/or (iv) award points or other attributes depending on the nature of the users' motion.

In various embodiments, during physical activities performed by users, the mobile computing device may not be on the user's person, and instructions may be given via a speaker or other remote devices connected to the mobile device. Further, computer vision algorithms may be used on the mobile device to guide and monitor the user being conducted within the mobile device camera's field of view. Accordingly, embodiments of devices described herein can employ artificial intelligence (AI) to facilitate automating one or more features of functionalities as described herein.

To provide for or aid in the numerous determinations (e.g., determine, ascertain, infer, calculate, predict, prognose, estimate, derive, forecast, detect, compute) of settings, player postures and player analytics described herein, components described herein may examine the entirety or a subset of data to which it is granted access and can provide for reasoning about or determine states of the system or environment from a set of observations as captured via events and/or data. Determinations may be employed to identify a specific context or action, or may generate a probability distribution over states, for example. The determinations may be probabilistic. That is, the computation of a probability distribution over states of interest based on a consideration of data and events. Determinations may also refer to techniques employed for composing higher-level events from a set of events and/or data.

Such determinations may result in the construction of new events or actions from a set of observed events and/or stored event data, whether the events are correlated in close temporal proximity, and whether the events and data come from one or several event and data sources. For example, instructions and feedbacks to player may be generated from one or more analytics derived from user actions. Further, components disclosed herein may employ various classification schemes (e.g., explicitly trained via training data or implicitly trained via observing behavior, preferences, historical information, receiving extrinsic information, etc.) and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems may be used to automatically learn and perform a number of functions, actions, and/or determinations.

Exemplary Management Computing Entity

FIG. 14 is an exemplary schematic diagram of a management computing entity 1400, such as a NEX server, for implementing a full body VR application, according to exemplary embodiments of the present invention. The terms computing entity, computer, entity, device, system, and/or similar words used herein interchangeably are explained in detail with reference to user computing entity 1300.

As indicated, in one embodiment, management computing entity 1400 may include one or more network or communications interface 1420 for communicating with various computing entities, such as by communicating data, content, information, and/or similar terms used herein interchangeably that can be transmitted, received, operated on, processed, displayed, stored, and/or the like. For instance, management computing entity 1400 may communicate with the user computing device 1300 and/or a variety of other computing entities. Network or communications interface 1420 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 1400 may be configured to communicate via wireless external communication networks using any of a variety of standards and protocols as discussed with reference to user computing device 1300.

As shown in FIG. 14, in one embodiment, management computing entity 1400 may include or be in communication with one or more processing unit 1410 (also referred to as processors, processing circuitry, processing element, and/or similar terms used herein interchangeably) that communicate with other elements within the management computing entity 1400. As will be understood, processing unit 1410 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 1410 may be configured for a particular use or configured to execute instructions stored in volatile or non-volatile media 1430 and 1440. As such, whether configured by hardware or computer program products, or by a combination thereof, processing unit 1410 may be capable of performing steps or operations according to embodiments of the present disclosure when configured accordingly.

Although not shown explicitly, management computing entity 1400 may include or be in communication with one or more input elements, such as a keyboard, a mouse, a touch screen/display, a camera for motion and movement input, a mic for audio input, a joystick, and/or the like. Management computing entity 1400 may also include or be in communication with one or more output elements such as speaker, screen/display, and/or the like.

In various embodiments, one or more of the components of management computing entity 1400 may be located remotely from other management computing entity components, such as in a distributed system or in the cloud. Furthermore, one or more of the components may be combined and additional components performing functions described herein may be included in the management computing entity 1400.

Machine Vision and Machine Learning Modules

As described herein, embodiments of the present invention may use one or more artificial intelligence, machine vision, and machine learning algorithms or modules for implementing a full body VR application (e.g., for constructing a 3D model of a player in a virtual environment). Various exemplary machine vision algorithms are within the scope of the present invention used for performing pose estimation, gesture recognition, object recognition, and so forth. The following description describes in detail some illustrative machine vision and machine learning algorithms for implementing some embodiments of the present invention.

Illustrative Machine Vision Architectures

Some exemplary machine vision algorithms utilize a deep learning network (DLN), for example a convolutional neural network (CNN). Neural networks are computer systems inspired by the human brain. They can be viewed as parallel, densely interconnected computational models that adaptively learn through automatic adjustment of system parameters based on training data. Input information are modified based on system parameters when traversing through layers of interconnected neurons or nodes, to activate or trigger particular outputs. The design of a neural network refers to the configuration of its architecture or topology, or the specific arrangements of layers and nodes in the network. The applicability, utility, and optimality of a neural network, and the framework in which the neural network is deployed are often mutually interdependent. Convolutional Neural Networks utilize the process of convolution to reduce the number of model parameters involved, while successfully capturing the spatial and temporal dependencies in an image.

Figure 15:
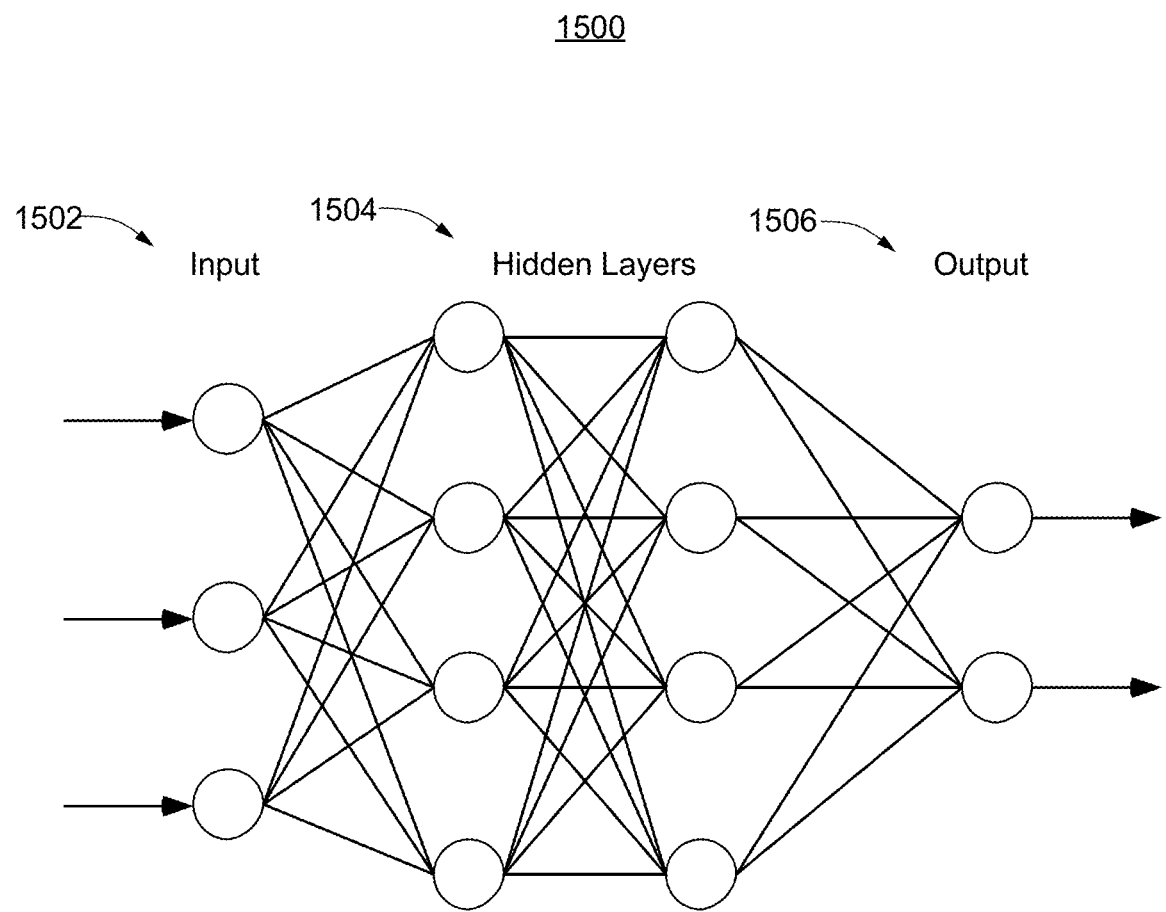
FIG. 15 shows an illustrative block diagram of a convolutional neural network (CNN) for image analysis, according to exemplary embodiments of the present invention.

More specifically, FIG. 15 shows an illustrative block diagram 1500 of a convolutional neural network (CNN) for image analysis and object recognition, according to exemplary embodiments of the present invention. This exemplary CNN module 1500 may be utilized for implementing various machine vision algorithms described herein. For example, it may be designed and trained to detect body bounding boxes, to determine gestures and poses, to determine segmentation maps, and to perform other machine vision tasks required by the present invention, as would be recognized by one of ordinary skill in the art. An input layer 1502 is connected via a multiplicity of hidden layers 1504 to an output layer 1506. Input layer 1502 is a map for pixels of an input image. Exemplary hidden layers may include, but are not limited to, convolutional layers, Rectified Linear Units (ReLU), pooling layers, normalization layers, and fully connected layers. A convolutional layer applies a convolution or correlation operation by a kernel matrix to the input data to generate a feature map of the input image. ReLU is a non-linear activation function. Pooling layers reduce the dimensionality of the data to decrease the required computational power. A fully connected layer has full connections to all activations in the previous layer, and is needed before classification or output activation at output layer 1506. Successive convolution-ReLU-pooling stages allow the successive extraction of low-level to high-level features, from edges, general shapes such as lines and circles, to specific shapes representing specific objects. FIG. 18A to 18E provide exemplary block diagrams of a detailed neural network design for pose estimation.

FIG. 15 shows only one illustrative CNN architecture that is within the scope of the present invention, but the present invention is not limited to the use of CNNs. Other machine vision algorithms are also within the scope of the present invention.

Illustrative Machine Learning Architectures

Figure 16:
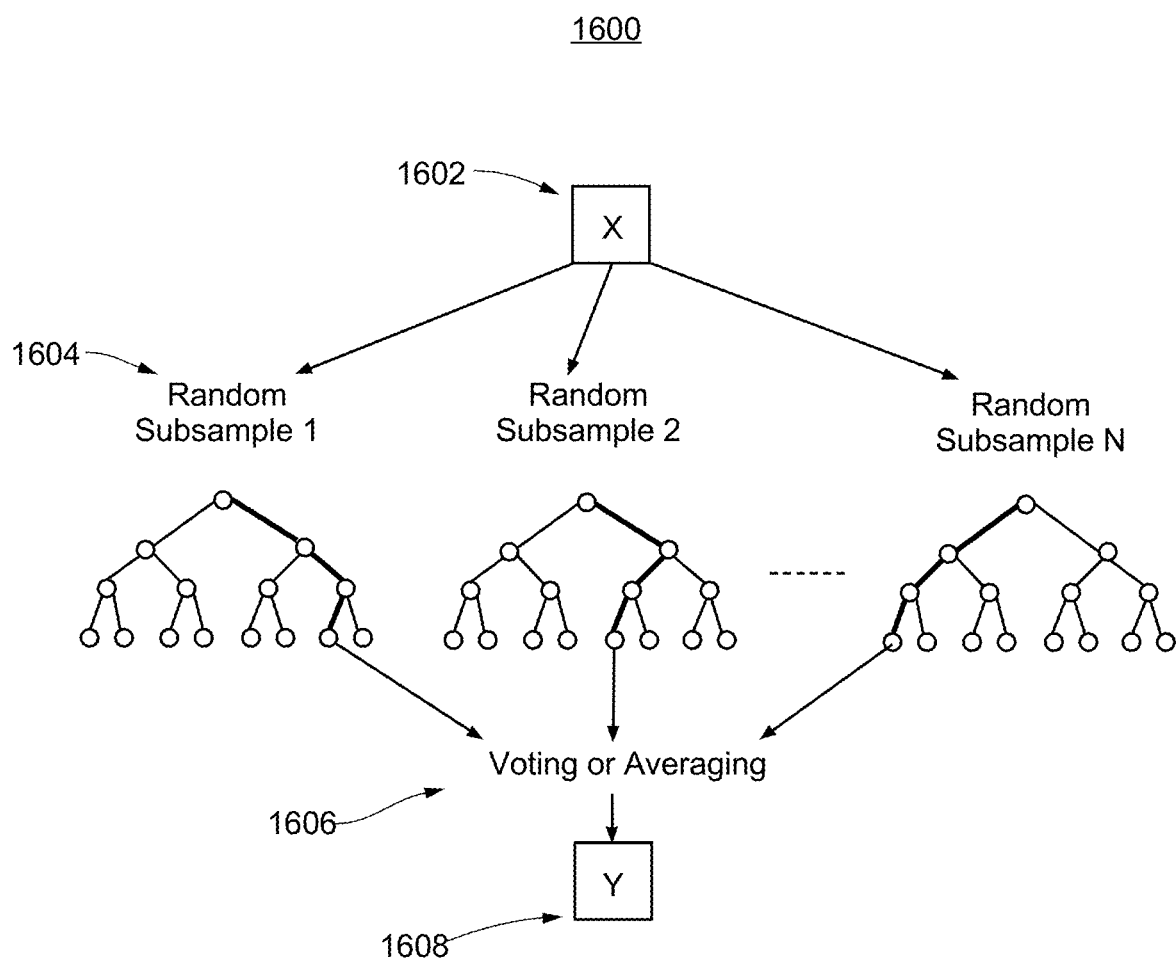
FIG. 16 shows an illustrative block diagram for a machine learning algorithm, according to exemplary embodiments of the present invention.

As states herein, various exemplary machine vision and machine learning algorithms are within the scope of the present invention for performing pose estimation, gesture recognition, object recognition, and so forth. FIG. 16 shows an illustrative block diagram 1600 for a machine learning algorithm, according to exemplary embodiments of the present invention.

In particular, a supervised machine learning algorithm is shown, comprising an illustrative random forest algorithm. Random forest algorithms are a method for classification and regression. By using a multitude of decision tree predictors 1604, each depending on the values of a random subset of a training data set 1602, the chances of overfitting to the training data set may be minimized. The decision tree predictors are voted or averaged at a decision step 1606 to obtain predictions 1608 of the random forest algorithm. For the task of object recognition, input 1602 to the machine learning algorithm may include feature values, while output 1608 may include predicted gestures and/or poses associated with a user. Random forest is only one illustrative machine learning algorithm that is within the scope of the present invention, and the present invention is not limited to the use of random forest. Other machine learning algorithms, including but not limited to, nearest neighbor, decision trees, support vector machines (SVM), Adaboost, Bayesian networks, various neural networks including deep learning networks, evolutionary algorithms, and so forth, are within the scope of the present invention.

In short, embodiments of devices, systems, and their various components described herein may employ artificial intelligence (AI) to facilitate automating one or more functions described herein, including object/user recognition, gesture recognition, and pose estimation.

Training Machine Learning Algorithms

Figure 17:
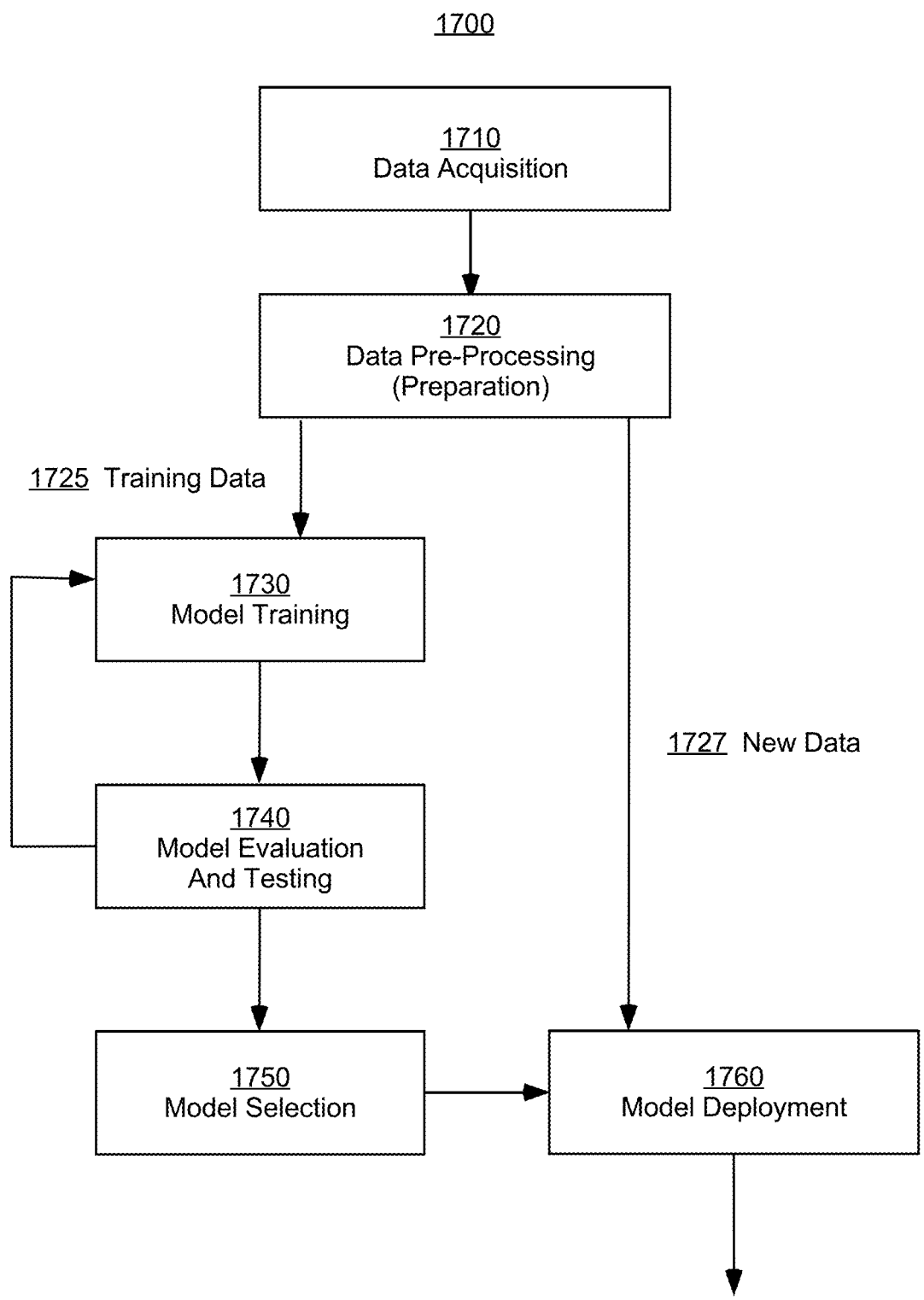
FIG. 17 shows an illustrative flow diagram for training a machine learning algorithm, according to exemplary embodiments of the present invention.

FIG. 17 shows an exemplary flow diagram 1700 for training a machine learning (ML) algorithm, which may be utilized in object recognition, pose estimation, and object flow construction, according to exemplary embodiments of the present invention.

The training process begins at step 1710 with data acquisition. At step 1720, acquired data are pre-processed, or prepared. At step 1730, a machine learning model is trained using training data 1725. At step 1740, the model is evaluated and tested, and further refinements to the model are fed back into step 1730. At step 1750, optimal model parameters are selected, for deployment at step 1760. New data 1727 may be used by the deployed model to make predictions.

A starting point for any machine learning method such as used by the machine learning component above is a documented dataset containing multiple instances of system inputs and correct outcomes (e.g., training data 1725). This data set may be used, using methods known in the art, including but not limited to standardized machine learning methods such as parametric classification methods, non-parametric methods, decision tree learning, neural networks, methods combining both inductive and analytic learning, and modeling approaches such as regression models, to train the machine learning system and to evaluate and optimize the performance of the trained system. Thus, it would be understood by peoples of ordinary skill in the art that "training data" 1725 as referred to in this subsection are directed to data for training a machine vision algorithm or a machine learning algorithm.

The quality of the machine learning system output depends on (a) pattern parameterization, (b) system design, and (c) quality of the training database. These components may be refined and optimized using various methods. For example, the database may be refined by adding datasets for new documented object categories, and/or human gestures and poses. The quality of the database may be improved, for example, by populating the database with cases in which object, gestures and/or poses were correctly recognized. In one embodiment, the database includes data, for example, of mistaken identification of objects, gestures and/or poses, which may assist in the evaluation of a trained system.

Exemplary Convolutional Neural Networks (CNNs) for Pose Estimation

Figure 18A:
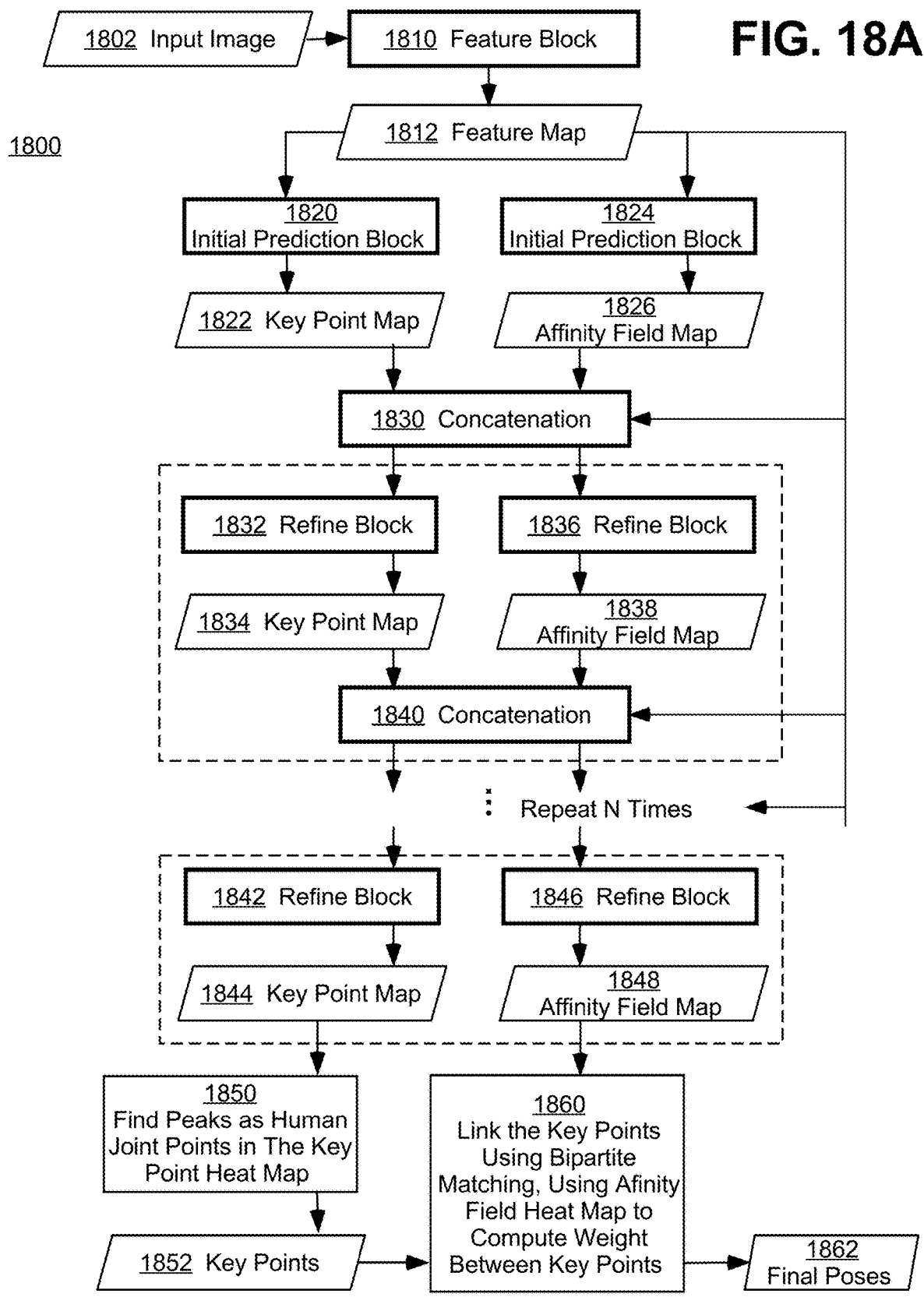
FIG. 18A is a block diagram of an exemplary neural network for pose estimation, according to exemplary embodiments of the present invention.

FIG. 18A is a block diagram 1800 of an exemplary neural network for pose estimation, according to some embodiments of the present invention. Here neural network layers or blocks are drawn with thickened lines. In this illustrative example, a two-branch CNN efficiently detects poses of multiple people in an input image by predicting part confidence maps for body parts, and part affinity fields for body part-to-body part association, effectively decoupling the detection of a body part such as an arm or leg, and the assignment of the detected body part to an individual person. A part affinity field (PAF) is a 2D vector field that encodes the location and orientation of body parts including limbs over the image domain. A PAF encodes the association between body parts, where body parts belonging to the same person are linked.

The illustrative network shown in FIG. 18A performs the following steps to estimate the pose of one or more persons in an input image:
1. Use a convolutional network block as a feature extractor to compute a feature map from an input image;
2. Turn the feature map into a key point heat map and an affinity field heat map using another convolutional network block;
3. Refine the key point heat map and the affinity field heat map using yet another convolutional network block, and repeat for several times;
4. Use Rectified Linear Units (ReLU), separable convolutional layers and/or batch normalization techniques to improve the accuracy and performance of the network;
5. Compute final poses by linking the key points using the affinity field heat map.

More specifically, an input image 1802 is first passed through a feature block 1810 to generate a feature map 1812. Initial prediction blocks 1820 and 1824 then extract a key point map 1822 and an affinity field map 1826, respectively. A concatenation operation 1830 is performed before further refinements are carried out in multiple iterations. For each stage of iteration, refine blocks such as 1832, 1836, 1842, and 1846 predict refined key point maps such as 1834 and 1844, and refined affinity field maps such as 1838 and 1848, respectively. Concatenation operations such as 1840 are performed to generate input for the next stage. A total of N refinements may be carried out, where N may be any positive integer. For example, N may equal to 5 in some embodiments of the present invention. After the last refinement stage, key point heat map 1844 is examined in step 1850 to find peaks as human joint points or key points 1852. Such key points may be linked in step 1860 to generate final poses 1862, by performing bipartite matching using affinity field heat map 1848 to compute weights between key points. In this illustrative example, key point map 1844 may comprise 18 channels, while affinity field map 1848 may comprise 34 channels.

FIG. 18B is a detailed block diagram illustrating an exemplary Feature Block 1810, according to some embodiments of the present invention. In this example, separable convolutional layers (SCL) are deployed with different kernel and stride sizes.

Correspondingly, FIG. 18C is a detailed block diagram illustrating an exemplary separable convolutional neural network layer 1870, according to some embodiments of the present invention. A depth-wise separable convolution or a separable convolution layer factorizes a conventional, full convolution operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. Batch optimization and ReLU blocks further help improve the accuracy and performance of the network layer. Furthermore, in some embodiments, inverted residuals may be utilized to connect linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Figure 18D:
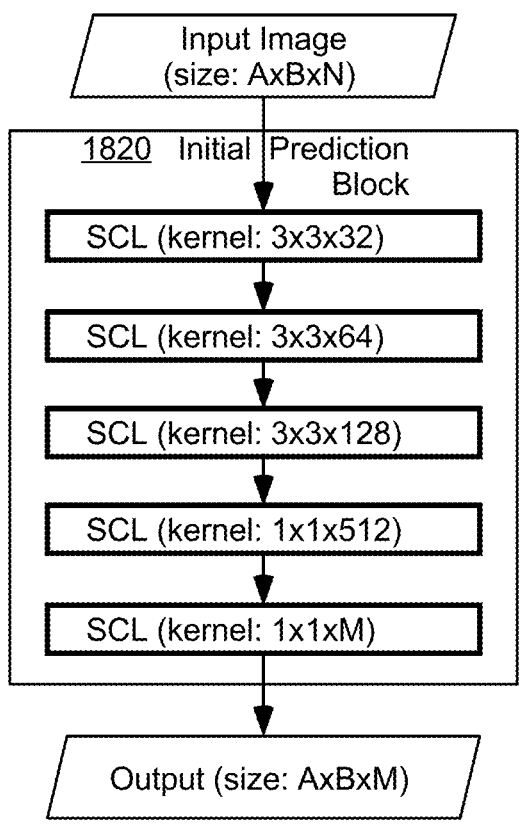
FIG. 18D is a detailed block diagram illustrating an exemplary Initial Prediction Block of FIG. 13A, according to exemplary embodiments of the present invention.
Figure 18E:
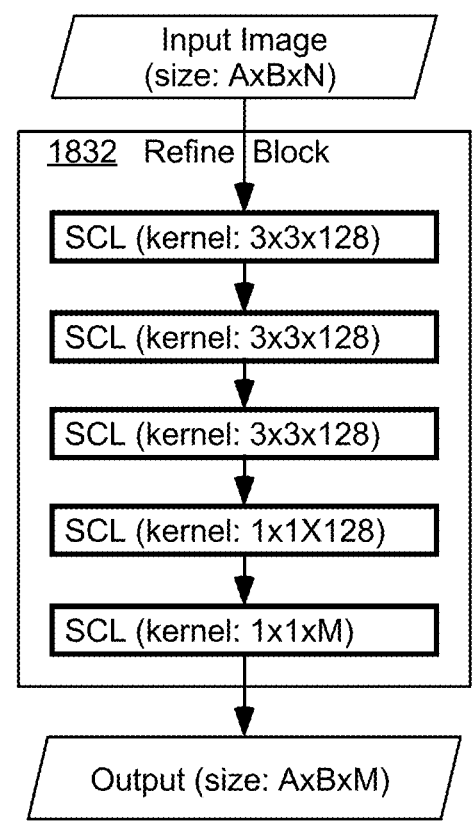
FIG. 18E is a detailed block diagram illustrating an exemplary Refine Block of FIG. 18A, according to exemplary embodiments of the present invention.

FIG. 18D is a detailed block diagram illustrating an exemplary Initial Prediction Block 1820, according to some embodiments of the present invention; FIG. 18E is a detailed block diagram illustrating an exemplary Refine Block 1832, according to some embodiments of the present invention. Both comprise multiple separable convolutional layers having different kernel sizes. The input, output, and kernel sizes shown in FIGS. 18A and 18E are for illustrative purposes only, and other similar hyperparameter values may be used in various embodiments of the present invention.

In some implementations of the present invention, one or more of existing software modules may be utilized, including but not limited to, CoreML for CNN object and key point detection, SceneKit for rendering a VR or AR court, and CoreMotion for understanding a mobile device's orientation.

Exemplary Convolutional Neural Networks (CNNs) for Object Detection

Figure 19A:
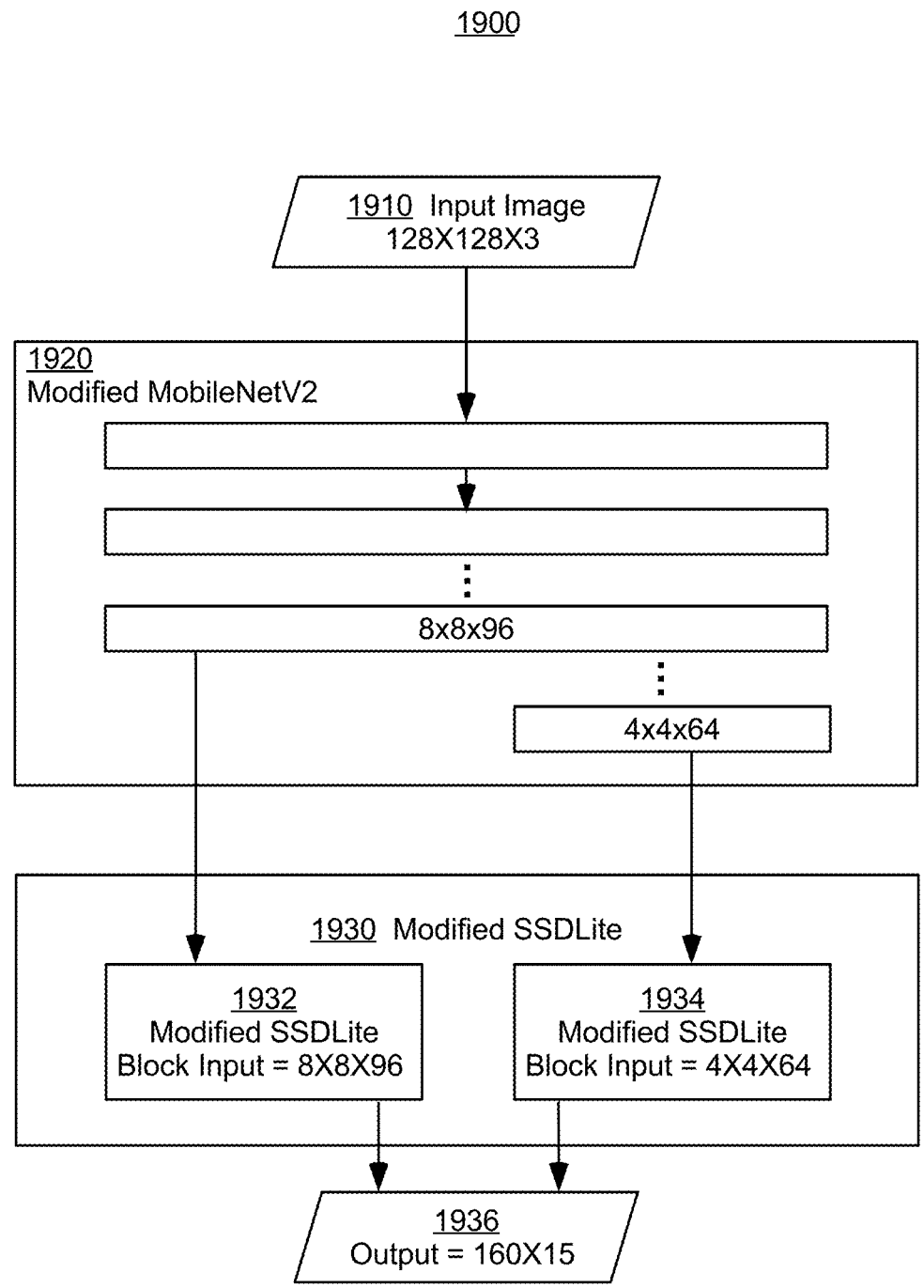
FIG. 19A is a block diagram of an exemplary neural network for object detection, according to one embodiment of the present invention.
Figure 19B:
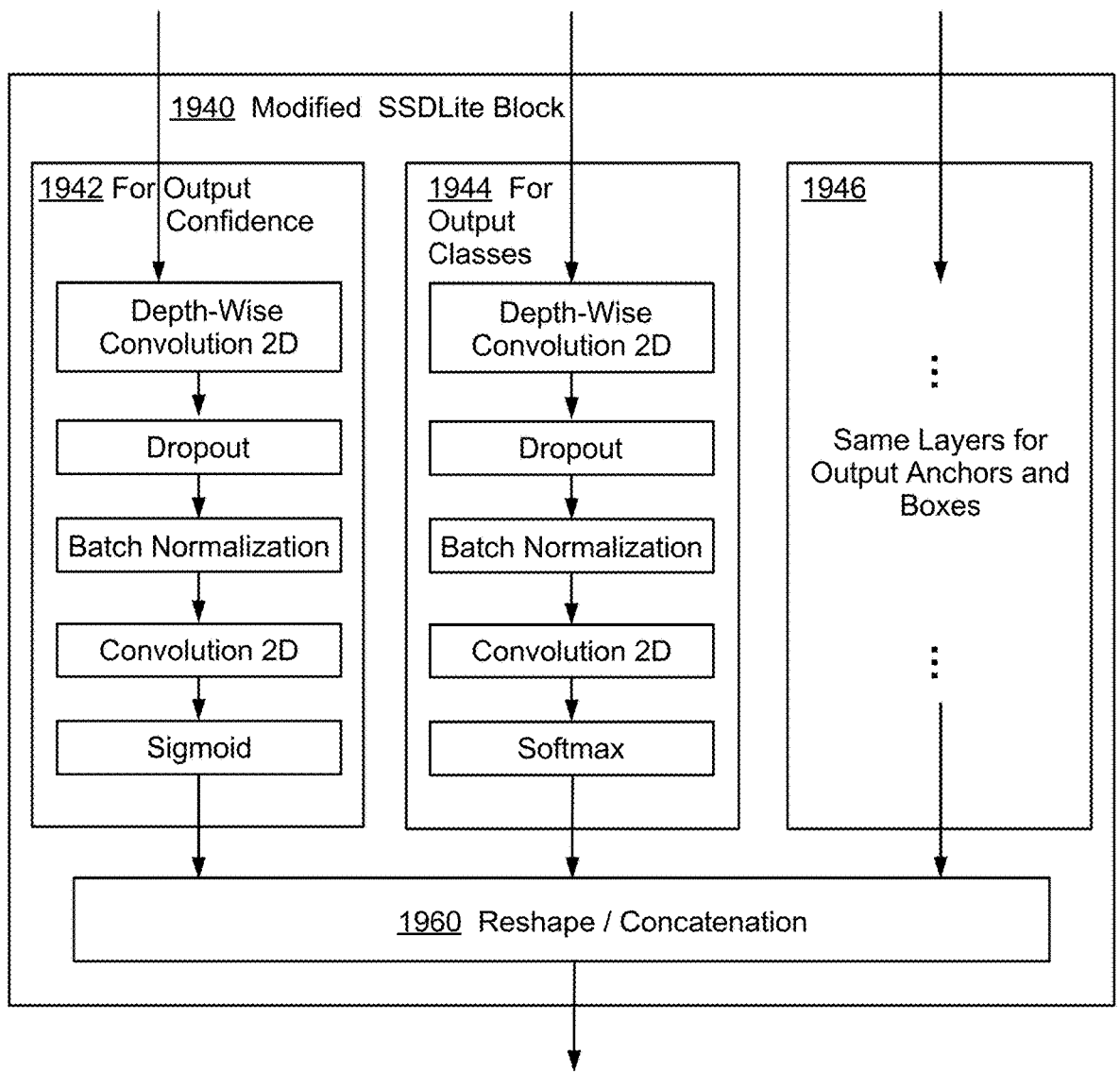
FIG. 19B is a detailed block diagram illustrating an exemplary Modified SSDLite Block of FIG. 19A, according to one embodiment of the present invention.

To generate virtual representation of a user in a virtual environment, first the user needs to be detected or extracted from RGB or RGB-D data. To detect moving and/or static human and non-human objects from an image or a video, FIGS. 19A and 19B show respective block diagrams of an exemplary neural network for user detection, according to one embodiment of the present invention. This user detector is presented for illustrative purposes only, and some embodiments of the present invention may utilize other computer vision system designs for user or object detection.

FIG. 19A is a block diagram 1900 of an exemplary neural network for user detection, according to some embodiments of the present invention. In particular, FIG. 19A shows a CNN-based user detector utilizing an optimized, modified MobileNetV2 framework as a feature extractor and a modified SSDLite framework for multi-scale object detection. An input image 1910 is first processed through a Modified MobileNetV2 block 1920, the output of which is processed through a Modified SSDLite module 1930 comprising two Modified SSDLite blocks 1932 and 1934, to generate output 1936. The input, output, and kernel sizes shown in FIGS. 19A and 19B are for illustrative purposes only, and other similar hyperparameter values may be used in various embodiments of the present invention.

MobileNetV2 is a convolutional neural network design for resource-constrained, mobile device-based computer vision applications. A first key building block of MobileNetV2 is depth-wise separable convolutions, which factorize a conventional, full convolutional operation into a first depth-wise convolution to filter the input channels, and a second point-wise convolution to combine outputs of the depth-wise network layer to build a feature map. Depth-wise separable convolutions trade significant improvements in computational efficiency for a small reduction in accuracy. A second key building block of MobileNetV2 is inverted residuals connecting linear bottleneck layers between individual depth-wise separable convolutional layers, which also tradeoff computation and accuracy. Linear bottleneck layers reduce the dimensionality of the input, while inverted residuals use shortcut connections between the bottlenecks to enable faster training and better accuracy.

Although not shown explicitly in FIG. 19A, in this exemplary embodiment, two MobileNetV2 output layers and 14 bottleneck operators may be used, a non-obvious reduction from the conventional setup with 6 MobileNetV2 output layers and 17 bottleneck operators. Such modifications optimize the feature extraction process to not only reduce the overall computational complexity but also improve the achievable accuracy by tailoring to the specific user detection goal.

FIG. 19B is a detailed block diagram illustrating an exemplary Modified SSDLite Block, such as 1932 or 1934 in FIG. 19A, according to some embodiments of the present invention. SSD refers to a Single Shot MultiBox Detector, a multi-object detection framework using a single deep neural network to discretize feature maps into multi-scale bounding boxes. SSD eliminates separate bounding box proposal generation and feature resampling stages to improve computation efficiency without compromising detection accuracy. SSDLite is a mobile-customized variant that utilizes depth-wise separable convolution in SSD prediction layers. Modified SSDLite block 1940 shown in the exemplary embodiment of FIG. 19B further tailors and improves the accuracy of SSDLite by adding dropout layers.

More specifically, in Modified SSDLite Block 1940, parallel network blocks 1942, 1944, and 1946 are utilized to process the input data separately for output confidence, output classes, and output anchors and bounding boxes. Each block has the same architecture, comprising a depth-wise convolution in 2D space, dropout, batch normalization, further convolution, and a functional operation for classification. Feature maps thus generated are reshaped and/or concatenated via processing block 1960 to generate output data.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g., any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention. The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module, or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A method for constructing a three-dimensional (3D) model of a user in a virtual environment, comprising:
   receiving an image of the user captured using an RGB-D (red, green, blue, depth) camera, wherein the image comprises a depth map;
   detecting a body bounding box associated with the user from the image using a first trained neural network;
   determining a segmentation map of the user from the depth map and the body bounding box by:
      determining estimated user depth based on the depth map;
      determining a body center depth pixel from the estimated user depth and the depth map, and
      converting the depth map into the segmentation map based on the body center depth pixel;
   determining a two-dimensional (2D) contour of the user from the segmentation map;
   forming a 3D extrusion model of the user by extruding the 2D contour; and constructing the 3D model of the user in the virtual environment by applying a geometric transformation to the 3D extrusion model to position the 3D model of the user at a target location and at a target scale factor in the virtual environment.

2. The method of claim 1, wherein the image of the user captured using the RGB camera comprises at least one of the user's upper body and the user's lower body.

3. The method of claim 1, wherein the converting the depth map into the segmentation map comprises:
converting the depth map into a binary map, based on a depth of the body center depth pixel and an offset; and
converting the binary map into the segmentation map, by flood filling the binary map from the body center depth pixel.

4. The method of claim 3, further comprising:
applying noise removal filtering on the binary map by using a morphological transform.

5. The method of claim 1, wherein the determining the estimated user depth comprises calculating a descriptive statistic of the depth map.

6. The method of claim 1, wherein the determining the body center depth pixel comprises minimizing both a difference to the estimated user depth and a distance from a center of the body bounding box.

7. The method of claim 1, wherein the forming the 3D extrusion model of the user by extruding the 2D contour further comprises:
converting a polygonal path in the 2D contour to a smooth path comprising one or more cubic Bezier curves having one or more control points based on vertices in the polygonal path.

8. The method of claim 1, wherein the RGB-D camera is connected to a computing device, and wherein the computing device is selected from the group consisting of a mobile phone, a laptop, a tablet, a set-top box, and a smart TV.

9. A system for constructing a three-dimensional (3D) model of a user in a virtual environment, comprising:
a processor; and
a non-transitory physical storage medium for storing program code accessible by the processor, the program code when executed by the processor causes the processor to:
receive an image of the user captured using an RGB (red, green, blue) camera;
detect a body bounding box associated with the user from the image using a first trained neural network;
determine a segmentation map of the user, based on the body bounding box;
determine a two-dimensional (2D) contour of the user from the segmentation map;
form a 3D extrusion model of the user by extruding the 2D contour, by converting a polygonal path in the 2D contour to a smooth path comprising one or more cubic curves having one or more control points based on vertices in the polygonal path; and
construct the 3D model of the user in the virtual environment by applying a geometric transformation to the 3D extrusion model to position the 3D model of the user at a target location and at a target scale factor in the virtual environment.

10. The system of claim 9, wherein the image of the user captured using the RGB camera comprises at least one of the user's upper body and the user's lower body.

11. The system of claim 9, wherein the RGB camera is an RGB-D camera, wherein the image of the user comprises a depth map associated with the user, and wherein the program code for determining the segmentation map of the user based on the body bounding box, when executed by the processor, causes the processor to:
determine an estimated user depth, based on the depth map associated with the user;
determine a body center depth pixel from the estimated user depth, the depth map, and the body bounding box; and
convert the depth map into a segmentation map, based on the body center depth pixel and an offset.

12. The system of claim 11, wherein the program code for converting the depth map into a segmentation map, when executed by the processor, causes the processor to:
convert the depth map into a binary map, based on a depth of the body center depth pixel and the offset; and
convert the binary map into a segmentation map, by flood filling the binary map from the body center depth pixel.

13. The system of claim 11, wherein the program code for determining the estimated user depth, when executed by the processor, causes the processor to calculate a descriptive statistic of the depth map.

14. The system of claim 11, wherein the program code for determining the body center depth pixel, when executed by the processor, causes the processor to minimize both a difference to the estimated user depth and a distance from a center of the body bounding box.

15. The system of claim 11, wherein the program code for determining the segmentation map of the user within the body bounding box, when executed by the processor, causes the processor to process the image within the body bounding box using a second trained neural network.

16. A non-transitory computer-readable physical storage medium for constructing a three-dimensional (3D) model of a user in a virtual environment, the storage medium comprising program code stored thereon, the program code when executed by a processor causes the processor to:
receive an image of the user captured using an RGB (red, green, blue) camera;
detect a body bounding box associated with the user from the image using a first trained neural network;
determine a segmentation map of the user by processing the image within the body bounding box using a second trained neural network;
determine a two-dimensional (2D) contour of the user from the segmentation map;
form a 3D extrusion model of the user by extruding the 2D contour; and
construct the 3D model of the user in the virtual environment by applying a geometric transformation to the 3D extrusion model to position the 3D model of the user at a target location and at a target scale factor in the virtual environment.

17. A method for constructing a three-dimensional (3D) model of a user in a virtual environment, comprising:
receiving an image of the user captured using an RGB (red, green, blue) camera;
detecting a body bounding box associated with the user from the image using a first trained neural network;
determining a segmentation map of the user by processing the image within the body bounding box using a second trained neural network;
determining a two-dimensional (2D) contour of the user from the segmentation map;
forming a 3D extrusion model of the user by extruding the 2D contour; and
constructing the 3D model of the user in the virtual environment by applying a geometric transformation to the 3D extrusion model to position the 3D model of the user at a target location and at a target scale factor in the virtual environment.

18. A non-transitory computer-readable physical storage medium for constructing a three-dimensional (3D) model of a user in a virtual environment, the storage medium comprising program code stored thereon, the program code when executed by a processor causes the processor to:
- receive an image of the user captured using an RGB-D (red, green, blue, depth) camera, wherein the image comprises a depth map;
- detect a body bounding box associated with the user from the image using a trained neural network;
- determine an estimated user depth based on the depth map;
- determine a body center depth pixel from the estimated user depth, the depth map, and the body bounding box;
- determine a segmentation map of the user from the depth map based on the body center depth pixel;
- determine a two-dimensional (2D) contour of the user from the segmentation map;
- form a 3D extrusion model of the user by extruding the 2D contour; and
- construct the 3D model of the user in the virtual environment by applying a geometric transformation to the 3D extrusion model to position the 3D model of the user at a target location and at a target scale factor in the virtual environment.

* * * * *

UNITED STATES PATENT AND TRADEMARK OFFICE
CERTIFICATE OF CORRECTION

| | |
|---|---|
| PATENT NO. | : 11,568,617 B2 |
| APPLICATION NO. | : 17/741617 |
| DATED | : January 31, 2023 |
| INVENTOR(S) | : Sung et al. |

Page 1 of 1

It is certified that error appears in the above-identified patent and that said Letters Patent is hereby corrected as shown below:

In the Claims

In Claim 1 (Column 30, Line 58), delete "estimated" and replace with -- an estimated --.

In Claim 1 (Column 30, Line 61), delete "depth map," and replace with -- depth map; --.

In Claim 9 (Column 31, Line 55), delete "cubic curves" and replace with -- cubic Bezier curves --.

In Claim 15 (Column 32, Line 27), delete "claim 11," and replace with -- claim 9, --.

Signed and Sealed this
Eighteenth Day of April, 2023

*Katherine Kelly Vidal*

Katherine Kelly Vidal
*Director of the United States Patent and Trademark Office*